(12) United States Patent
Langenbach et al.

(10) Patent No.: US 7,738,602 B2
(45) Date of Patent: Jun. 15, 2010

(54) CHANNEL ESTIMATION AND SEQUENCE FOR THE RECEPTION OF OPTICAL SIGNAL

(75) Inventors: Stefan Langenbach, Nuremberg (DE); Nebojsa Stojanovic, Munich (DE)

(73) Assignee: CoreOptics, Inc., Wilmington, DE (US)

( * ) Notice: Subject to any disclaimer, the term of this patent is extended or adjusted under 35 U.S.C. 154(b) by 917 days.

(21) Appl. No.: 10/563,084

(22) PCT Filed: Jul. 1, 2004

(86) PCT No.: PCT/EP2004/007155

§ 371 (c)(1),
(2), (4) Date: May 22, 2006

(87) PCT Pub. No.: WO2005/011220

PCT Pub. Date: Feb. 3, 2005

(65) Prior Publication Data

US 2006/0274861 A1     Dec. 7, 2006

(30) Foreign Application Priority Data

Jul. 2, 2003   (EP)   ................................. 03015024

(51) Int. Cl.
*H04L 27/06* (2006.01)
*H04B 10/06* (2006.01)
(52) U.S. Cl. .................... 375/341; 398/155; 398/202
(58) Field of Classification Search ................. 375/242, 375/262, 265, 340, 341; 398/151, 155, 160, 398/202; 714/794, 795
See application file for complete search history.

(56) References Cited

U.S. PATENT DOCUMENTS 3,931,584 A      1/1976   Motley et al.
(Continued)

FOREIGN PATENT DOCUMENTS

EP           1 139 619 A1     10/2001
(Continued)

OTHER PUBLICATIONS

Azadet et al., "Equalization and FEC Techniques for Optical Transceivers", IEEE Journal of Solid-State Circuits, vol. 37, No. 3, (Mar. 2002), pp. 317-327.
(Continued)

*Primary Examiner*—Young T. Tse
(74) *Attorney, Agent, or Firm*—Howard M. Gitten; Edwards Angell Palmer & Dodge, LLP

(57) ABSTRACT

The invention relates to a method for channel estimation. The method comprises digitizing an analog signal representing a sequence of symbols thereby associating one digital word out to the level of said analog signal at each sampling time. The most likely sequence of said symbols is detected. To this end branch metrics are provided. According to one embodiment, a symbol period comprises at least two sampling times. Moreover, the branch metrics are obtained from frequencies of digital words resulting from a digitizing and the symbols of the most likely sequence. According to another embodiment, a symbol period comprises at least one sampling time. Events are counted wherein each event is defined by a channel state and a current digital word. Each channel state is defined by a pattern of symbols relative to a current symbol determined at the time of a current digital word. A model distribution is fitted to event counts and a branch metrics is obtained from the fitted model distribution. Moreover, the invention relates to corresponding symbol detectors for optical receivers.

27 Claims, 14 Drawing Sheets

U.S. PATENT DOCUMENTS

| | | | |
|---|---|---|---|
| 5,208,839 A * | 5/1993 | Hladik et al. | 375/360 |
| 5,263,053 A | 11/1993 | Wan et al. | |
| 5,313,495 A | 5/1994 | Kim | |
| 6,477,125 B1 * | 11/2002 | Hayami | 369/59.22 |
| 6,775,219 B2 | 8/2004 | Fujiwara et al. | |
| 6,977,879 B1 * | 12/2005 | Hamada et al. | 369/53.34 |
| 2002/0080898 A1 | 6/2002 | Agazzi et al. | |
| 2003/0198169 A1 * | 10/2003 | Fujiwara et al. | 369/59.22 |
| 2006/0274861 A1 | 12/2006 | Langenbach et al. | |

FOREIGN PATENT DOCUMENTS

| | | |
|---|---|---|
| EP | 1 443 697 A1 | 8/2004 |
| EP | 1 453 238 A1 | 9/2004 |
| EP | 1 473 831 A1 | 11/2004 |
| WO | WO 02/30035 A1 | 4/2002 |

OTHER PUBLICATIONS

Buchali et al., "Adaptive Decision Feedback Equalizer for 10 Gbit/s Dispersion Mitigation", in Proc. ECOC 2000, Munich, Germany, 2 pages.

Chugg et al., "MLSE for an Unknown Channel—Part I: Optimality Considerations", IEEE Transactions on Communications, vol. 44, No. 7 (Jul. 1996), pp. 836-846.

Dittrich et al., "Iterative Equalization for Nonlinear Channels with Intersymbol Interference", Kleinheubacher Berichte, 2001.

Ghosh et al., "Maximum-likelihood blind equalization", Opt. Eng. vol. 31, 6, 1992, 1224-1228.

Haunstein et al., "Implementation of Near Optimum Electrical Equalization at 10 Gbit/s", Nuremberg, Germany, ECOC 2000, 2 pages.

Haykin, "Adaptive Filter Theory, An Overview of the Blind Deconvolution Problem", $4^{th}$ ed., Prentice-Hall, 2001, pp. 684-735.

Kavcic et al., "Correlation-Sensitive Adaptive Sequence Detection", IEEE Transactions on Magnetics, vol. 34, No. 3 (May 1998), pp. 763-771.

Kavcic et al., "The Viterbi Algorithm and Markov Noise", IEEE Transactions on Information Theory, vol. 46, No. 1, (Jan. 2000), pp. 291-301.

Lin et al., "Error Control Coding, Fundamentals and Applications", (1983) Apprentice Hall, Inc., pp. 287-315.

Raheli et al., "Per-Survivor Processing: A general Approach to MLSE in Uncertain Environments", IEEE Trans. Commun. vol. 43, No. 2/3/4, 1995, pp. 354-364.

S.U.H. Qureshi, "Adaptive Equalization", Proc. IEEE, vol. 73, 1985, pp. 1349-1387.

Sauer-Greff et al., "Adaptive Viterbi Equalizers for Nonlinear Channels", SIPCO '2000, pp. 25-29.

Bohn et al., "An Adaptive Optical Equalizer Concept for Singel Channel Distortion Compensation", ECOC 2001.

Bulow et al., "Electronic PMD Mitigation—from Linear Equalization to Maximum-Likelihood Detection", OFC 2001.

Bulow et al., "Electronic Enhanced Optical PMD Compensation", ECOC 2000.

Otte, et al., "Performance of Electronic Compensator for Chromatic Dispersion & SPM", ECOC 2000.

Sticht et al., "Adaptation of Electronic PMD Equaliser Based on BER Estimation Derived from FEC Decoder", ECOC 2001.

Viterbi, "Error Bounds for Convolutional Codes and an Asymptotically Optimim Decoding Algorithm" IEEE Trans. Inf. Theory, IT-13, pp. 260-269, Apr. 1967.

* cited by examiner

Brauch-Metric

$$BM_{tot}(\underline{b},r_1,r_2) = BM(\underline{b},r_1) + BM(\underline{b},r_2)$$

$$BM_{tot}(\underline{b},r_1,r_2) = BM_1(\underline{b},r_1) + BM_2(\underline{b},r_1,r_2)$$

$$BM_{tot}(\underline{b},r_1,r_2) = BM(\underline{b},r_1,r_2)$$

$$BM_{tot}(\underline{b},r_1,r_2) = BM_1(\underline{b},r_1) + BM_2(\underline{b},R(r_1),r_2)$$

| channel state $\underline{b}$ | quantized data $r_1$ or $r_2$ | | | | | | | |
|---|---|---|---|---|---|---|---|---|
| | 0 | 1 | 2 | 3 | 4 | 5 | 6 | 7 |
| $\underline{b}(0)$=000 | f(0,0) | f(0,1) | f(0,2) | f(0,3) | f(0,4) | f(0,5) | f(0,6) | f(0,7) |
| $\underline{b}(1)$=001 | f(1,0) | f(1,1) | f(1,2) | f(1,3) | f(1,4) | f(1,5) | f(1,6) | f(1,7) |
| $\underline{b}(2)$=010 | f(2,0) | f(2,1) | f(2,2) | f(2,3) | f(2,4) | f(2,5) | f(2,6) | f(2,7) |
| $\underline{b}(3)$=011 | f(3,0) | f(3,1) | f(3,2) | f(3,3) | f(3,4) | f(3,5) | f(3,6) | f(3,7) |
| $\underline{b}(4)$=100 | f(4,0) | f(4,1) | f(4,2) | f(4,3) | f(4,4) | f(4,5) | f(4,6) | f(4,7) |
| $\underline{b}(5)$=101 | f(5,0) | f(5,1) | f(5,2) | f(5,3) | f(5,4) | f(5,5) | f(5,6) | f(5,7) |
| $\underline{b}(6)$=110 | f(6,0) | f(6,1) | f(6,2) | f(6,3) | f(6,4) | f(6,5) | f(6,6) | f(6,7) |
| $\underline{b}(7)$=111 | f(7,0) | f(7,1) | f(7,2) | f(7,3) | f(7,4) | f(7,5) | f(7,6) | f(7,7) |

Fig.6

$$BM_{tot}(\underline{b},r_1,r_2) = BM(\underline{b},r_1)+BM(\underline{b},r_2)$$

| channel state $\underline{b}$ | quantized data $r_1$ | | | | |
|---|---|---|---|---|---|
| | 0 | ... | $r_1$ | ... | 7 |
| $\underline{b}_0$=000 | $BM_1(0,0)$ | ... | $BM_1(0,r_1)$ | ... | $BM_1(0,7)$ |
| ... | ... | | ... | | ... |
| $\underline{b}_s$ | $BM_1(s,0)$ | ... | $BM_1(s,r_1)$ | ... | $BM_1(s,7)$ |
| ... | ... | | ... | | ... |
| $\underline{b}_7$=111 | $BM_1(7,0)$ | ... | $BM_1(7,r_1)$ | ... | $BM_1(7,7)$ |

Fig.8

| channel state $\underline{b}$ | quantized data $r_2$, $BM_2$ conditioned on $r_1$=1 | | | | |
|---|---|---|---|---|---|
| | 0 | ... | $r_2$ | ... | 7 |
| $\underline{b}_0$=000 | $BM_2(0,r_1,0)$ | ... | $BM_2(0,r_1,r_2)$ | ... | $BM_2(0,r_1,7)$ |
| ... | ... | | ... | | ... |
| $\underline{b}_s$ | $BM_2(s,r_1,0)$ | ... | $BM_2(s,r_1,r_2)$ | ... | $BM_2(s,r_1,7)$ |
| ... | ... | | ... | | ... |
| $\underline{b}_7$=111 | $BM_2(7,r_1,0)$ | ... | $BM_2(7,r_1,r_2)$ | ... | $BM_2(7,r_1,7)$ |

$BM_{tot}(\underline{b},r_1,r_2) = BM_1(\underline{b},r_1) + BM_2(\underline{b},r_1,r_2)$

Fig.9

| channel state $\underline{b}$ | quantized data $r_2$, $BM_2$ conditioned on $R(r_1)=1$ | | | | |
|---|---|---|---|---|---|
| | 0 | ... | $r_2$ | ... | 7 |
| $\underline{b}_0=000$ | $BM_2(0,R(r_1),0)$ | ... | $BM_2(0,R(r_1),r_2)$ | ... | $BM_2(0,R(r_1),7)$ |
| ... | ... | | ... | | ... |
| $\underline{b}_s$ | $BM_2(s,R(r_1),0)$ | ... | $BM_2(s,R(r_1),r_2)$ | ... | $BM_2(s,R(r_1),7)$ |
| ... | ... | | ... | | ... |
| $\underline{b}_7=111$ | $BM_2(7,R(r_1),0)$ | ... | $BM_2(7,R(r_1),r_2)$ | ... | $BM_2(7,R(r_1),7)$ |

$$BM_{tot}(\underline{b},r_1,r_2) = BM_1(\underline{b},r_1)+BM_2(\underline{b},R(r_1),r_2)$$

Fig.11

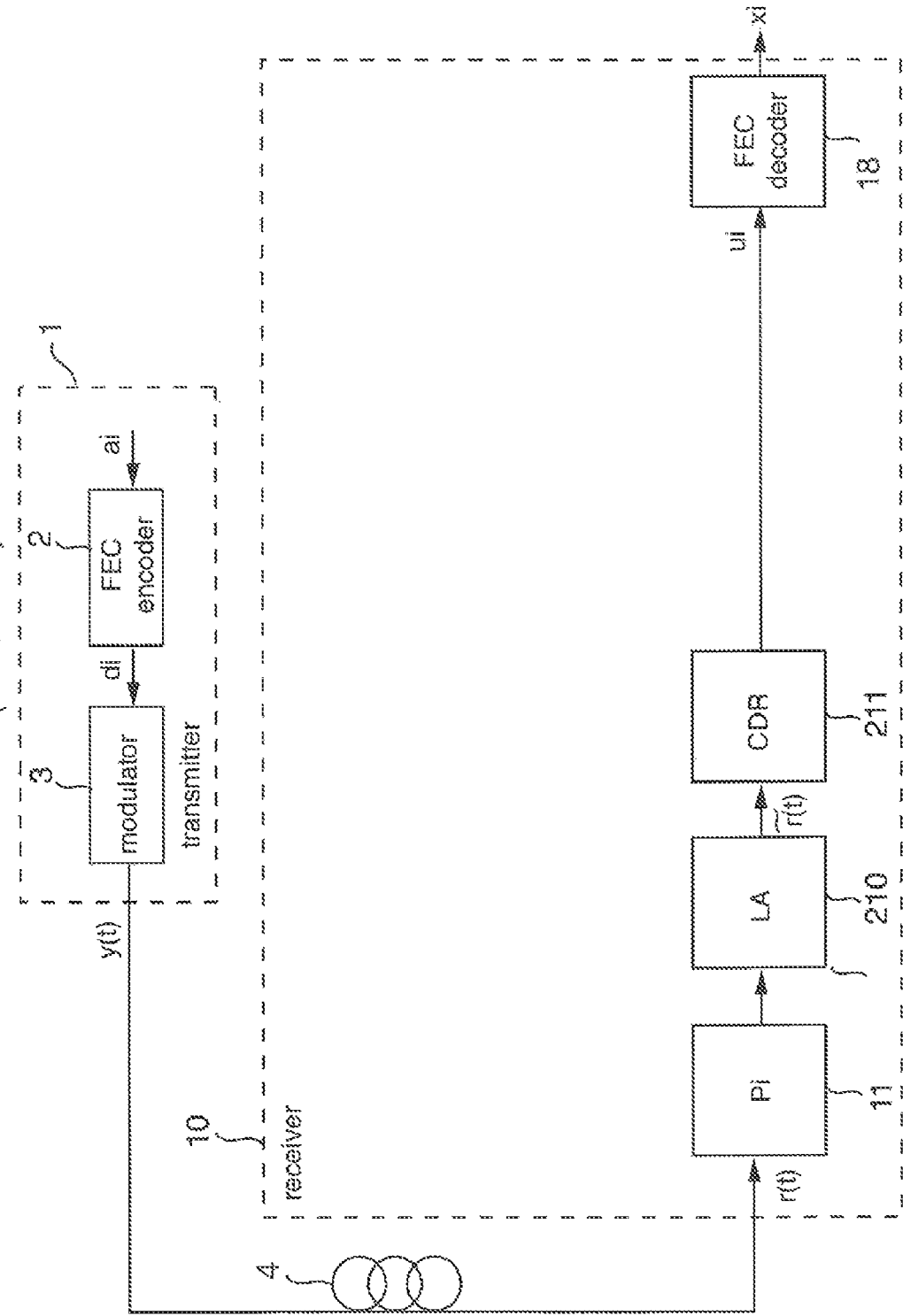

CHANNEL ESTIMATION AND SEQUENCE FOR THE RECEPTION OF OPTICAL SIGNAL

The present invention pertains to high-speed optical fiber communication systems and in particular to methods for Channel estimation and symbol detectors for optical receivers, for improving the bit error rate (BER) when detecting symbols received via channels suffering from both severe signal distortion causing undesired inter-symbol interference of several symbols and from severe noise.

According to a specific aspect, the invention pertains to the preamble parts of claims 1 and 21 which is known from U.S. Pat. No. 5,313,495, "Demodulator for symbols transmitted over a cellular channel" and U.S. Pat. No. 5,263,053, "Fractionally spaced maximum likelihood sequence estimation receiver".

According to another aspect, the invention pertains to the preamble parts of claims 2 and 22 which is known from W. Sauer-Greff, A. Dittrich, et al. "Adaptive Viterbi Equalizers for Nonlinear Channels" SIPCO, 2000, 25-29, (later referred to as "Sauer00").

In a digital communication system symbols are transmitted, where typically a number of $2^n$ symbols are used. In the binary case (n=1), there are two different symbols, designated logic 0 (zero) and logic 1 (one).

High-speed optical fiber communication systems comprise in particular Single-channel systems Including SDH and SONET, DWDM systems, CWDM systems and Systems for dynamically switched OTN (G.709 and related).

A conventional high-speed optical fiber communication system as shown in FIG. 17 comprises a transmitter 1, an optical channel 4 and a receiver 10. State of the art transmitters typically comprise a forward error correction (FEC) encoder 2 and a modulator 3. A state of the art receiver 10 comprises a physical interface 11, a limiting amplifier (LA) 210, a clock and data recovery circuit 211 and a FEC decoder 18.

At the receiver side of the optical link the optical signal comprising received analog data r(t) is input into receiver 10. Receiver 10 comprises physical interface 11 which performs an optical-to-electrical (O/E) conversion. The analog electrical signal is input into limiting amplifier 210. Both, the physical interface 10, limiting amplifier 210 and CDR circuit 211 have an upper cut-off frequency. Both cut-off frequencies are usually significantly higher than 1/(2T), T being the symbol period, in order to keep inter symbol interference low. On the other hand too much excess bandwidth in excess over the required minimum picks up more noise from the optical link 4, which degrades the receiver performance by increasing the bit error rate. In typical receiver designs an excess bandwidth of 50% to 100% is therefore provided (S. U. H. Qureshi, "Adaptive equalization", Proc. IEEE, Vol. 73, 1985, pp. 1349-1387, later referred to as "Qureshi85").

The optical link comprises optical fibers, which attenuate the optical signal and in addition constitute a dispersive channel. In order to compensate for the attenuation the optical link may comprise optical amplifiers comprising Erbium-doped fibers, which add noise to the optical signal thereby degrading the signal-to-noise ratio.

In state of the art dense wave division multiplexer (DWDM) systems the optical signal suffers from sever signal distortions that are caused by chromatic dispersion or group velocity dispersion (GVD), polarization mode dispersion (PMD), self-phase-modulation (SPM), four-wave-mixing (FWM), cross-phase modulation (XPM), and polarization dependent loss (PDL). These kinds of distortions cause inter-symbol interference (ISI).

Conventional receivers for high-speed fiber-optical communication systems employ a decision circuit that operates only under "open eye" conditions, i.e. when the "eye diagram" at the decision circuit allows a choice of sampling phase and threshold such that a hard binary symbol decision can be made with sufficiently low error rate (cf. E. Voges, K. Petermann, (Eds.), "Optische Kommunikationstechnik", Springer, Berlin Heidelberg, 2002; G. Keiser, "Optical Fiber Communications", 3rd ed., McGraw-Hill, 2000; G. P. Agrawal, "Fiber-Optic Communication Systems", 2nd ed., Wiley, New York, 1997).

Moreover optical links suffer from varying received optical power by tens of dB and imperfect e.g. band-limited or chirped transmitters. In addition communication channels may be time-variant and ensemble-variant, which results in varying distortion, ISI, noise and optical effects.

It is well known that a maximum-likelihood sequence detector (MLSD) is the optimum detector if the receiver has perfect knowledge about the channel. However, interestingly, K. M. Chugg, A. Polydoros showed ("MLSE for an Unknown Channel—Part I: Optimality Considerations", IEEE Trans. Commun. Vol. 44, 7, 1996, 836-846 later referred to as "Chugg96") that there is no well-defined jointly optimal estimate of both an unknown linear channel and data sequence in the maximum-likelihood sense. Hence, following the de-facto conventions in the literature e.g. M. Gosh, C. L. Weber, "Maximum-likelihood blind equalization", Opt. Eng. Vol 31, 6, 1992, 1224-1228 (later referred to as "Gosh92"), in the following the term "optimal" or "optimized" is used in a somewhat loose sense. What is meant is that a solution of minimized BER is sought within some practical framework or solution space, not excluding the case that in a slightly modified framework even lower BER might be achieved.

MLSDs are mostly Implemented using the Viterbi algorithm (VA), originally proposed by A. J. Viterbi in "Error Bounds for Convolutional Codes and an Asymptotically Optimum Decoding Algorithm" (IEEE Trans. Inf. Theory, IT-13, pages 260 to 269, April 1967) for decoding convolutional codes (confer Shu Lin, Daniel J. Costello Jr., "Error Control Coding: Fundamentals and Applications" Prentice-Hall, Inc., Englewood Cliffs, N.J. 07632, 1983).

The Viterbi algorithm may also be used for channel equalization in order to cope with ISI. On a binary ISI channel, at a channel memory of m bits, there are $2^m$ states corresponding to all possible bit sequences of length m and 2 transitions entering and leaving each state, i.e. there are $2^{m+1}$ transitions between successive stages or time units in the trellis.

In an initializing step of the Viterbi algorithm beginning at an initial stage a path metric for a single path entering each state at the initial stage is computed. Each transition between states corresponds to a symbol. The path and its path metric is stored for each state.

The Viterbi algorithm further comprises a repeating step. In the repeating step the path metric for all the paths entering a state at a stage is computed by adding the branch metric entering that state to the metric of the connecting survivor at the state of the preceding stage. For each state the path with the largest path metric, called survivor path, is stored together with its path metric, and all other paths are eliminated.

A log-likelihood function log P(r|v) is called the metric associated with the path v and is denoted M(r|v). The metrics to be chosen depend on the properties of the transmission path. They may e.g. be obtained from measurements of signal statistics (noise), or from a priori knowledge. The metrics may be assumed to be time invariant and listed in a look-up table for each transition from one state to another for a special application or it may be obtained from on-line measurements which will be explained in more detail in connection with Sauer00.

More recently, it became desirable to operate optical links under conditions in terms of distortions and noise that would lead to a closed eye due to ISI at the detection circuit (cf. e.g., ECOC and OFC, annual conferences). Most approaches to solving this problem use either optical or electrical equalizers to compensate ISI in order to "open" the closed eye at the detection circuit. These approaches are mostly based on sub-optimal methods of equalization, namely linear feed-forward equalization (FFE), decision-feedback equalization (DFE), or a combination of both, FFE and DFE (Cf. e.g. K. Azadet, et al., "Equalization and FEC Techniques for Optical Transceivers", IEEE J. Solid State Circuits, Vol. 37, 3, 2002, 317-327 23; Bohn, Mohs, et al., "An Adaptive Optical Equalizer Concept for Single Channel Distortion Compensation", ECOC 2001; K. Sticht, et al., "Adaptation of Electronic PMD Equaliser Based on BER Estimation Derived From FEC Decoder", ECOC 2001 (later referred to as "Sticht01"); F. Buchali, H. Bülow, W. Kuebart, "Adaptive Decision Feedback Equalizer for 10 Gbit's Dispersion Mitigation", ECOC 2000; S. Otte, W. Rosenkranz, "Performance of Electronic Compensator for Chromatic Dispersion & SPM", ECOC 2000; H. Bülow, F. Buchali, G. Thielecke, "Electronically Enhanced Optical PMD Compensation", ECOC 2000; H. Bülow, "Electronic PMD Mitigation—from Linear Equalization to Maximum-Likelihood Detection", OFC 2001).

Only some publications (e.g. US 2002/0080898 A1, "Methods and systems for DSP-based Receivers" and H. Haunstein, A. Dittrich et al. "Implementation of near optimum electrical equalization at 10 Gbit/s", ECOC 2000, later referred to as "Haunstein00") either discuss or investigate the use of a theoretically optimum maximum-likelihood receiver, which, in this context, is also referred to as MLSE equalizer. Strictly speaking, there is no explicit equalization step in a MLSD. It is, however, conventional to call a MLSD a Viterbi equalizer. However, these approaches are rarely used in practice, probably because this receiver type is commonly believed to be too complex as outlined in Qureshi85, in particular p. 1370. And notably, in optical communications, MLSD receivers so far have only been discussed as symbol spaced solutions, which are believed to have no severe sampling phase dependence (cf. Sticht01).

With the advent of the so-called optical transport network (OTN), forward error correction (FEC) schemes are now conventionally used to provide improved tolerance against noise resulting from both optical amplifiers in the transmission channel and receiver. E.g. a 16 times interleaved (255, 239) Reed-Solomon code has been standardized in OTN recommendation G.709 of the ITU (International Telecommunication Union). More recently, even stronger FEC schemes are conventionally used, which can work with pre-decoding BER as high as e.g. $10^{-3}$ (Cf. ECOC and OFC). When BER estimation is used for optimization of some receiver parameters, this BER estimation is conventionally computed in a FEC decoder (e.g. Sticht01).

In addition to the usual white Gaussian noise model, in optical receivers noise correlation occurs (caused e.g. by noise coloring in receive filters or by DWDM channel interferers), and noise may be signal-dependent, especially in optically amplified systems. For MLSD receivers, noise correlation and signal dependent noise can be handled for special noise models, as is discussed in the context of magnetic recording (A. Kavcic, J. M. F. Moura, "The Viterbi Algorithm and Markov Noise Memory", IEEE Trans. Inform. Theory, IT-46, 1, 2000, 291-301 (later referred to as Kavcic00); A. Kavcic, J. M. F. Moura, "Correlation-sensitive adaptive sequence detection", IEEE Trans. Magn., Vol. 34, 1998, 763-771 (later referred to as Kavcic98)), albeit restricted to the symbol-spaced receivers and to Gaussian noise processes.

Conventional high-speed clock recovery circuits for broadband systems can even fail for severely distorted signals under noise. However, when they work, they will in general provide a sub-optimum sampling phase, which calls for controlled sampling phase adjustment as is shown in e.g. Sticht01. For carrying out this invention it is assumed that some state of the art clock recovery subsystem (see FIG. 2, CR 14) is available that is able to recover a clock with approximately fixed but otherwise arbitrary phase relation to the transmit clock. The remaining, non-trivial, problem then is to find a sampling phase that leads to minimum BER or to near-minimum BER. Especially for distorted input signals, it is neither assumed nor required that the raw sampling phase as recovered by clock recovery is a BER-optimal sampling phase.

Unlike e.g. In mobile wireless communication, in optical communications the receiver must often adapt to the received signal without the use of a training sequence. Moreover, several effects causing distortion are significantly time-variant albeit not extremely fast. In essence, the receiver is faced with a difficult adaptive blind equalization problem i.e. both the transmitted data sequence and the transmission channel properties are unknown. In principle, there are several known approaches to the blind equalization problem e.g. the Bussgang algorithm, Higher-Order Statistics and joint channel and data estimation, all basically using a nonlinearity to generate some substitute for the missing reference or training signal. All except the probabilistic estimation methods make use of a linear filter model of the channel.

According to Simon Haykin, "Adaptive Filter Theory", $4^{th}$ edition, Prentice-Hall, 2001, for blind equalization the problem of ensuring convergence to the global BER minimum is an open problem. Prototypical for many blind equalization solutions that have been described for certain, e.g. wireless applications, the so-called sequence feedback (cf. J. W. M. Bergmans, "Digital Baseband Transmission and Recording", Kluwer Academic Publishers, Dordrecht, 1996) or PSP approaches (Chugg96; R. Raheli, A. Polydoros, C.-K. Tzou, "Per-Survivor Processing: A general Approach to MLSE in Uncertain Environments, IEEE Trans. Commun. Vol 43, 2/3/4, 1995, 354-364, later referred to as "Raheli95") to channel estimation, due to its complexity, are not suitable for high-speed optical communication receivers.

An integral part of most equalizer solutions, including MLSD equalizers as disclosed e.g. in U.S. Pat. No. 5,313,495 and U.S. Pat. No. 5,263,053 is the concept of an error signal that is based on synthesizing a desired hypothetical channel response, given a current linear channel model estimation, tentative decisions made in the detector and the actually received signal. This hypothetical response and the actually received response are compared and used to derive error signals or decision metrics. Such an error signal and the derived metrics then incorporate mainly the effects of noise, plus the effects of residual mis-equalization i.e. of imperfections of the channel model. Residual mis-equalization is sometimes referred to as convolutional noise. However, as discussed e.g. in Haunstein00, an explicitly linear channel model is fundamentally inappropriate for the nonlinear optical channel employed in intensity-modulated signaling with direct-detection square-law receivers.

It is still believed that a training sequence is required in optical communications for channel acquisition (Haunstein00; A. Dittrich, M. Siegrist, W. Sauer-Greff, R. Urbansky, "Iterative Equalization for Nonlinear Channels with Intersymbol Interference", Kleinheubacher Berichte, 2001).

In contrast to most estimation methods that estimate the parameters of an explicit filter channel model, EP 1 139 619 A1, "Channel estimation using a probability mapping table" describes a very interesting implicit channel estimation method for sequence estimation, based on histogram sets: These histograms represent sample amplitude statistics conditioned on channel state and are used to derive branch metrics for a MLSD. The scheme described, however, is limited to symbol spaced processing and describes only the case of a sample depending on preceding symbols. Moreover, the application fails to disclose any suitable method for initializing such a receiver (blind acquisition), which implies the need for training.

More specifically, Sauer00 discloses an adaptive Viterbi equalizer for non linear channels. For white noise and equally probable symbol sequences an MLSE minimizes the sequence error probability. The received analog input signal is sampled at the symbol rate T after analog processing by a matched filter. It is assumed that consecutive samples are statistically independent and a sample depends on L+1 symbols only due to ISI. The metric increments being equivalent to the logarithm of channel transition probabilities describe the statistical properties of the transmission channel and do not depend on assumptions like linearity or Gaussian probability density function; they are pre-computable or result from measurement. A look up table may be provided which is addressed by q quantized input bits and L+1 bits for the channel state in order to obtain the metric increment. The look up table may be based on measurements. The probabilities can be approximated by relative frequencies of occurrence, i.e. the number of occurrence of the event, that for a certain channel state (current and L previous symbols) the sampled output is within a quantization interval associated with q quantized input bits per total number of trials. After a sufficient long accumulation period the logarithms of the event counts normalized to the accumulation period yield the look up table entries. Thereby precaution against zero event counts has to be implemented e.g. by interpolation. To set up the look up table for unknown channels, a known training sequence, addressing all different channels states has to be transmitted for a sufficient long period. To update the conditional probabilities during normal data transmission, memory cells are addressed using the estimated states resulting from the MLSE output.

Haunstein00 and EP 1 139 619 A1 written partly by the same authors or inventors, respectively disclose similar subject matter.

Kavcic98 discloses both "leading and trailing ISI lengths" corresponding to pre- and postcursor symbols in the context of magnetic recording restricted to the symbol-spaced receivers and to Gaussian noise processes.

U.S. Pat. No. 5,313,495 discloses a demodulator for symbols transmitted over a digital cellular channel. It comprises a MLSE which is implemented using a Viterbi algorithm. Cellular channels suffer from multi-path fading. The Viterbi equalizer may require excessive computation overhead when estimating symbols which are subject to an ISI. In cellular communication systems, because geographic changes of the transmitter are frequent and unpredictable, fading and ISI become excessive and the use of a Viterbi equalizer requires that an algorithm be employed which implements 16 or 64 states. A simpler four-state Viterbi equalizer using a first order least means square channel estimator only marginally meets the BER requirements for the cellular system. The higher order, such as 16 or 64 state Viterbi equalizer will require a prohibitive amount of computation. Therefore a four state Viterbi equalizer is provided together with over sampling the signal at twice the normal symbol rate. In addition to calculating the branch metrics based on two samples, channel estimation is based on over sampled symbol data.

Also U.S. Pat. No. 5,263,053 discloses a fractionally spaced maximum likelihood sequence estimation receiver. An embodiment is described in connection with π/4-shifted differential quadrature phase-shift-keying (π/4-DQPSK) transmission which has been proposed for digital transmission using cellular telephones. Due to the multi-path characteristic ISI distortion and noise corruption do occur. For the MLSE the Viterbi algorithm is used. The state of a channel can be though of representing the last L symbols that have been applied to it at any particular time where the channel memory length is L symbol periods before the present symbol. Two fold over-sampling is performed.

It is the object of this invention to optimize the bit error rate of a digital signal received via an ISI-impaired, noisy channel.

This object is achieved by the subject matters of the independent claims.

Preferred embodiments of the invention are the subject matter of the dependent claims.

It is advantageous to decide a symbol with the help of both, precursor and postcursor energy since typical dispersion of optical fibers which may be symmetrical broadens a symbol to overlap with both, preceding and following symbols.

A fractionally spaced maximum-likelihood sequence detector is advantageous for compensating inter symbol interference since the various kinds of dispersions of optical fibers result in a continuous broadening of one symbol into the neighboring symbols.

The various kinds of dispersions of the optical channel result in a continuous broadening of the symbols and consequently in ISI. Especially in connection with excess bandwidth a fractional ISI compensation provides better performance, requires fewer symbols to be allowed for in the ISI compensation and as a consequence requires less computation resources for providing an equivalent performance.

Obtaining branch metrics from detected symbols advantageously automatically adapts the branch metrics to the channel actually used. So this way of updating the branch metrics provides a practical solution for the blind acquisition problem of optical channels.

Fitting a model distribution to counter values proportional to the frequencies measured eliminates runaways and in particular eliminates counter values of 0 which have to be replaced by a low value in order to avoid an error when a logarithm is calculated therefrom in order to obtain the branch metrics. Two-fold over-sampling is feasible even in high frequency applications and results only in a moderate cost increase compared to symbol sampling.

In an embodiment each event is defined by a channel state and a digital word independently of the sampling phase or time. This on the one hand ignores the relation between the sampling phases and on the other hand leads to a simple implementation. Moreover counting each kind of events results in higher counter values compared to more sophisticated methods. In particular the later point results in better statistics even after short accumulation periods.

Distinguishing between a first kind of events relating to a first sampling time and a second kind of events relating to a second sampling time conditioned on the digital word measured at the first sampling time accounts for the correlation of sampling values for the same symbol obtained at different sampling times.

In order to improve the sampling statistics for the counter values relating to the second sampling phase, the digital words obtained at the first sampling phase may be grouped into subsets. The number of subsets is smaller than the number of possible digital words and a so-called coarse digital word is associated to each subset. In this embodiment a second event is defined by a channel state, a digital word obtained at the second sampling phase conditioned on a coarse digital word.

In another embodiment, which allows for the correlation of the different samples obtained for the same symbol, only one kind of events is counted which is defined by a channel state and a digital word for each sampling phase. In the case of two-fold-over sampling this embodiment only requires as much counts are required for counting the second kind of events for example obtained at the second time conditioned on the sample obtained at the first sampling time. Moreover, the branch metric calculated from the counter values constitute total branch metrics. So this embodiment does not require an addition of sample branch metrics in order to obtain (total) branch metrics.

Providing the adjustment of sampling times into a quasi-continuous delay of the sampling clock and a discrete sampling phase adjustment shortens the delay range for the sampling clock and thereby is much easier to implement.

Proper adjustment of the sampling times or phases lowers the BER. Adjusting the sampling phase based on bit error rate estimates leads to an optimum bit error rate by definition.

Also the adjustment of the sampling phase by maximizing a population difference parameter results in a at least near optimum BER.

An idle period between two consecutive accumulation periods can be reduced if additional circuitry is provided for performing the counting of each kind of events in parallel to the calculating of branch metrics for the channel statistics accumulated during the previous accumulation period.

Blending the old branch metrics with new branch metrics using a forgetting factor may be considered as extending the averaging period over the accumulation period. This speeds up the adaptation of the branch metrics to new channel conditions because the accumulation period can be shorter than a necessary averaging period. This is in particular relevant for the embodiments counting a large number of events due to bad statistics. Moreover, such a way of updating reduces the danger of oscillation between two independent meta-stable channel models when calculating the branch metrics in parallel to the counting.

Blending old branch metrics with newly calculated branch metrics is mathematically less correct, but it is acceptable if only small changes are expected. In this embodiment it is not necessary to save the old counter values used for calculating the old branch metrics.

Due to the non-linear nature of any logarithm it is more correct to blend old and new counter values and calculate the branch metrics from the blended counter values.

Setting the branch metrics for the channel states for isolated 0's and 1's to identical values when initiating the branch metrics constitutes a generic channel model which provides good convergent behavior in, both low and high dispersion cases.

Setting the branch metrics for channel states being symmetrical to each other to identical values provides a good starting point for dispersion affecting precursor and postcursor symbols in a similar manner.

Monitoring for an abnormally high bit error rate and/or pathological amplitude statistics allows re-initialization with a hopefully more appropriate set of branch metrics.

In the following preferred embodiments of this invention are described referring to the accompanying drawings. In the drawings:

FIG. 6 shows a set of frequencies or counter values used for the calculation of a channel model.

FIG. 8 shows the partial branch metrics of a channel model specific for the first sampling phase.

FIG. 9 shows the partial branch metrics of a channel model specific for the second sampling phase conditioned on the previous sampling value $r_1$ obtained at the first sampling phase.

FIG. 11 shows the partial branch metrics of a channel model specific for the second sampling phase conditioned on the previous coarse sampling value $R(r_1)$ obtained at the first sampling phase.

FIG. 17 illustrates a conventional high-speed optical fiber communication system.

ABBREVIATIONS

Figure 1:
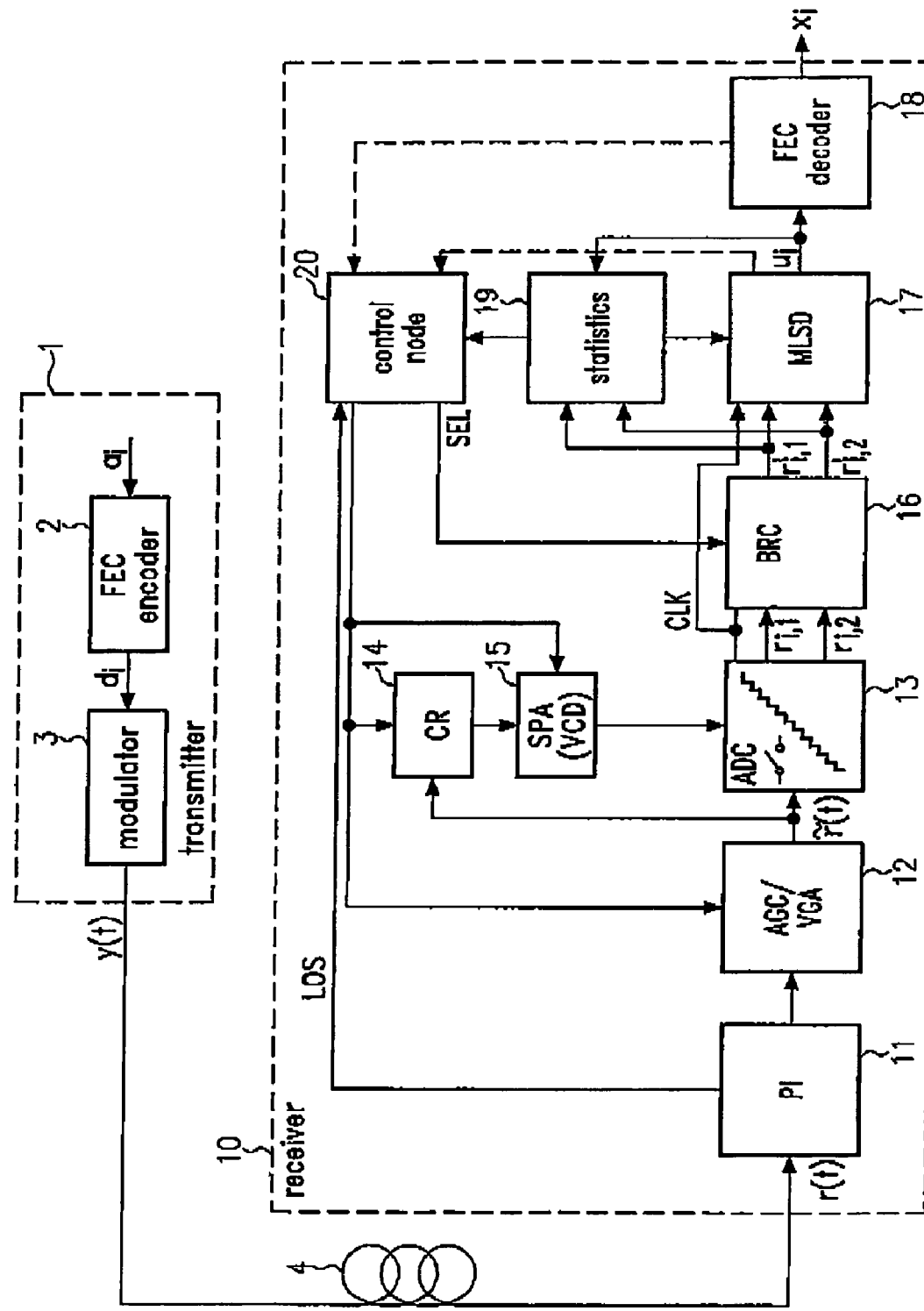
FIG. 1 shows a block diagram of an optical fiber communication system.

| | Abbreviations |
|---|---|
| a.k.a.: | Also known as |
| ACS: | Add-Compare-Select |
| ADC: | Analog-To-Digital Conversion |
| AGC: | Automatic Gain Control |
| APD: | Avalanche Photo Diode |
| BER: | Bit Error Rate |
| BMU: | Branch Metric Unit |
| BRC: | Bit rearranging circuit |
| CDR: | Clock and Data Recovery |
| CE: | Channel Estimation |
| CR: | Clock Recovery |
| CWDM: | Coarse Wavelength Division Multiplexing |
| DFE: | Decision-Feedback Equalizer |
| DGD: | Differential Group Delay |
| DLL: | Delay Locked Loop |
| DMUX: | Demultiplexer |
| DSP: | Digital Signal Processor |
| DWDM: | Dense Wavelength Division Multiplexing |
| ECOC: | European Conference on Optical Communication |
| FEC: | Forward Error Correction |
| FFE: | Feed-Forward Equalizer |
| FS MLSE: | fractionally spaced MLSE |
| FWD: | Frequency Window Detector |
| FWM: | Four-Wave-Mixing |

-continued

| | |
|---|---|
| GVD: | Group Velocity Dispersion |
| HOS: | Higher Order Statistics |
| HW: | Hardware |
| ISI: | Inter-Symbol Interference |
| ITU: | International Telecommunication Union |
| LA: | Limiting amplifier |
| LF: | Loop Filter |
| LOS: | Loss Of Signal |
| MAP: | Maximum A-Posteriori Probability |
| MLSD: | Maximum-Likelihood Sequence Detector |
| MLSE: | Maximum-Likelihood Sequence Estimator |
| MUX: | Multiplexer |
| NRZ: | Non-Return-to-Zero |
| OSNR: | Optical Signal-To-Noise Ratio |
| OTN: | Optical Transport Network |
| PD: | Phase Detector |
| PDL: | Polarization Dependent Loss |
| PFLL: | Phase/Frequency Locked Loop |
| PLL: | Phase Locked Loop |
| PIN: | Positive Intrinsic Negative (doping structure) |
| PMD: | Polarization Mode Dispersion |
| PSP: | Per-Survivor Processing |
| r.m.s.: | Root mean square |
| SDH: | Synchronous Digital Hierarchy |
| SIPCO: | Signal Processing Conference |
| SMU: | Survivor Metric Unit |
| SONET: | Synchronous Optical Network |
| SOS: | Second-Order Statistics |
| SPA: | Sampling Phase Adjustment |
| SPM: | Self-Phase Modulation |
| SW: | Software |
| TBU: | Trace Back Unit |
| TED: | Timing Error Detector |
| TF: | transversal filter |
| TIA: | Trans-Impedance Amplifier |
| VA: | Viterbi Algorithm |
| VGA: | Variable Gain Amplifier |
| VCD: | Voltage Controlled Delay |
| VCO: | Voltage Controlled Oscillator |
| XPM: | Cross-Phase Modulation |

| Mathematical Symbols | |
|---|---|
| $a_i$: | source data |
| b: | channel state vector |
| BM: | branch metric |
| c: | count |
| $d_i$: | encoded data |
| f: | frequency |
| F: | forgetting factor |
| h: | number of precursor symbols |
| i: | current symbols |
| j: | number of postcursor symbols |
| k: | index of consecutively calculated sets of BM |
| L: | oversampling factor |
| l: | Index for sample within one symbol; $l \in 1 \ldots L$ |
| M: | number of states in Viterbi detector |
| N: | number of symbols defining the channel state |
| Q: | number of distinguished quantization values ($2^R$) |
| q: | $0, 1, \ldots, Q-1$ |
| r(t): | received analog data |
| R: | resolution (in bits) of the quantizer |
| s: | channel state index |
| S: | number of different symbols |
| T: | symbol time |
| y(t): | sent analog data |
| $r_{i,l}$: | (oversampled) quantized data $q \in 0 \ldots Q-1$ |
| $r'_{i,l}$: | associated (oversampled) quantized data $q \in 0 \ldots Q-1$ |
| $u_i$: | Detected (undecoded) data |
| $x_i$: | Decoded data |

While the present invention is described with reference to the embodiments as illustrated in the following detailed description as well as in the drawings, it should be understood that the following detailed description as well as the drawings are not intended to limit the present Invention to the particular illustrative embodiments disclosed, but rather the described Illustrative embodiments merely exemplify the various aspects of the present invention, the scope of which is defined by the appended claims.

In particular, the receiver concept described in this application is motivated by but not limited to fiber optical communication. It can be applied for any digital baseband communication system with a-priori unknown multi-symbol ISI that extends over a moderate number of symbols. An optical receiver comprising an inventive digitizer can operate with an acceptable OSNR penalty of below 8 dB. At a data rate of 10.7 Gbit/it can work e.g. in a range of −3500 ps/nm to 3500 ps/nm residual GVD or up to about 240 ps instantaneous (first order) DGD. Several sources of distortion can occur simultaneously, e.g. GVD combined with PMD, at mutual expense of their OSNR penalty contributions. The M=4 receiver will work as long as dominant (within quantizer accuracy) parts of the impulse response do not spread significantly beyond a total width of three symbol periods. This enables up to 200 km optically amplified metro links without dispersion compensation.

FIG. 1 shows an optical transmission system. It comprises a transmitter 1, an optical channel 4 and a receiver 10. A typical transmitter 1 comprises an FEC encoder 2 for encoding input data $a_i$ in order to generate encoded data $d_i$ which is forwarded to a modulator 3. The modulator 3 generates an optical signal comprising sent analog data y(t) constituting the output of transmitter 1. There is no low-pass filter for explicitly band-limiting the spectrum in the baseband before modulation. Neighbour channels of DWDM systems are separated in the optical domain by optical bandpass filters.

The optical signal is transmitted via optical channel 4 to receiver 10.

At the receiver side of the optical link received analog data r(t) is input into receiver 10. The receiver 10 comprises a physical Interface 11, a AGC or variable gain amplifier (VGA) 12, an ADC 13, a clock recovery (CR) 14, a sampling phase adjustment (SPA) circuit 15, an MLSD 17, a FEC decoder 18, a channel statistic unit 19 and a receiver control node 20. In addition receiver 10 may comprise a bit rearranging circuit (BRC) 16 in particular if the delay range of SPA circuit 15 is smaller than a symbol period.

The physical interface 11 performs an optical-to-electrical (O/E) conversion. The physical interface is a standard PIN or APD optical front-end with trans-impedance amplification (TIA). The physical interface also acts as an implicit low-pass filter for the received analog data.

The analog serial signal data at the output of a PIN or APD optical front-end is amplified by a high-gain high-dynamic, low-noise automatic gain control (AGC) circuit 12. The output signal of AGC 12 is designated $\tilde{r}(t)$. The AGC circuit 12 may amplify the analog electrical signal to a constant level in terms of peak-to-peak voltage, average rectified voltage or root-mean-square voltage. In another embodiment the amplification of AGC circuit 12 may be controlled by control unit receiver control node 20 based on quantized data $r_i$(cf. U.S. Pat. No. 3,931,584, "Automatic Gain Control") for fine-grained control of the amplification. In the latter case it is more appropriate to designate unit 12 as a variable gain amplifier (VGA). The control of the VGA may be based on frequencies of peak digital values $r_i$ (cf. US 2002/0113654 A1) or on a frequency of digital values $r_i$ within a digital value range (cf. U.S. Pat. No. 3,931,584). In another embodiment, a coarse and a fine VGA circuit may be provided. These circuits may be controlled by one of the methods disclosed in co-pending European patent application number 03009564.0, "Method for controlling amplification and circuit", which has also been filed by CoreOptics and is incorporated herein by reference. Based on the statistic data provided by channel statistics unit 19 the receiver control node 20 may obtain peak data (cf. U.S. Pat. No. 3,931,584) or calculate a uniformity parameter, in compliance with EP03009564.0, for adjusting the gain of AGC/VGA circuit 12. In any embodiment the variable amplification of AGC/VGA 12 maps the input signal into the input voltage range of the ADC 13 and CR 14.

The ADC 13 digitizes the analog signal r̃(t) and outputs quantized data $r_i=r_{i,l}$. Index i refers to symbols and index l to different sampling phases. Index l may assume the values 1 to L for L-fold oversampling. The ADC 13 receives a sampling clock from SPA circuit 15 which in turn receives a sampling clock from clock recovery subsystem 14, which will be explained in more detail in connection with FIG. 2. The SPA circuit 15 operates as an adjustable delay in order to optimize the phase of the clock which is to say to optimize the sampling times of ADC 13.

If the receiver shown In FIG. 1 does not perform oversampling, the clock recovery subsystem 14 recovers the symbol frequency. Sampling is performed either on the falling or rising clock edge of the clock inputted Into ADC 13. If two fold over sampling is performed the clock recovery subsystem 14 may also recover the symbol frequency. In this case the ADC 13 samples at both, the rising and falling clock edges. In the general case of L-fold oversampling a frequency L times higher than the symbol frequency is recovered. Alternatively, for L-fold oversampling, multiphase clocks can be used i.e. L clocks each having symbol frequency but a different phase. If in the case of multiphase clocks both falling and rising edges are used for sampling, L clocks may have half symbol frequency or L/2 clocks may have symbol frequency.

The receiver control node 20 in connection with channel statistics unit 19 may perform a method similar to the disclosure of WO 02/30035 A1. Alternatively receiver control node 20 in connection with channel statistics unit 19 and SPA circuit 15 may perform one of the methods disclosed in co-pending European patent application number 03004079.4, "Self-timing method for adjustment of a sampling phase in an oversampling receiver and circuit", which has also been filed by CoreOptics and is later referred to as EP03004079.4. In particular, from the channel statistics also a population difference parameter may be calculated for performing phase adjustment as disclosed in this co-pending European patent application, which is incorporated herein by reference.

Finally the receiver control node 20 may obtain bit error estimates from MLSD 17 or FEC decoder 18 for optimizing the amplification of AGC/VCA circuit 12 or the phase by controlling SPA circuit 15. Receiver control node 20 may perform a gradient search in order to minimize the bit error estimates. As bit error estimate an unreliable detection event as described in co-pending European patent application number 03002172.9, "Error rate estimation method for a receiver and receiver apparatus", which has also been filed by CoreOptics, may be used. European patent application number 03002172.9 is incorporated herein by reference. In one embodiment the ADC 13 has a three bit resolution corresponding to eight distinguished quantization levels. In other embodiments the ADC resolution may be different e.g. two, four or eight bits corresponding to four, 16 or 256 quantization levels.

The ADC 13 may comprise a single sampler sampling the analog signal at the appropriate frequency. The output may be provided serially to MLSD 17. In another embodiment, which is compatible with FIG. 1, the output of an oversampling sampler may be demultiplexed and latched for further processing by bit rearranging circuit 16. In another embodiment also compatible with FIG. 1, one sampler may be provided for each sampling phase. Each of the samplers operates at the symbol frequency and may latch its output for further processing by bit rearranging circuit 16.

The quantized data $r_{i,l}$ are input into bit rearranging circuit 16 which is explained in more detail in connection with FIG. 3. Bit rearranging circuit 16 outputs associated data $r'_{i,l}$ into MLSD 17. MLSD 17 may implement a Viterbi algorithm (VA) and outputs the most likely sequence designated detected data $u_l$ to FEC decoder 18. In a typical optical receiver, with a powerful FEC code used, the bit error rate at the output of MLSD 17 ranges e.g. from $10^{-2}$ to about $10^{-4}$. The subsequent FEC decoder 18 further reduces bit error rate to a range between $10^{-9}$ and $10^{-16}$ which is required for data transmission. FEC decoder outputs decoded data $x_i$ for further processing. MLSD 17 and/or FEC 18 may obtain BER estimates and provide same to control node 20.

Control node 20 receives a loss-of-signal (LOS) signal from physical interface 11 and may receive counter values or event frequency information from statistic unit 19 in order to obtain pre-processed statistics data for controlling the AGC/VGA circuit 12, CR 14, SPA circuit 15 and bit rearranging circuit 16.

Figure 2:
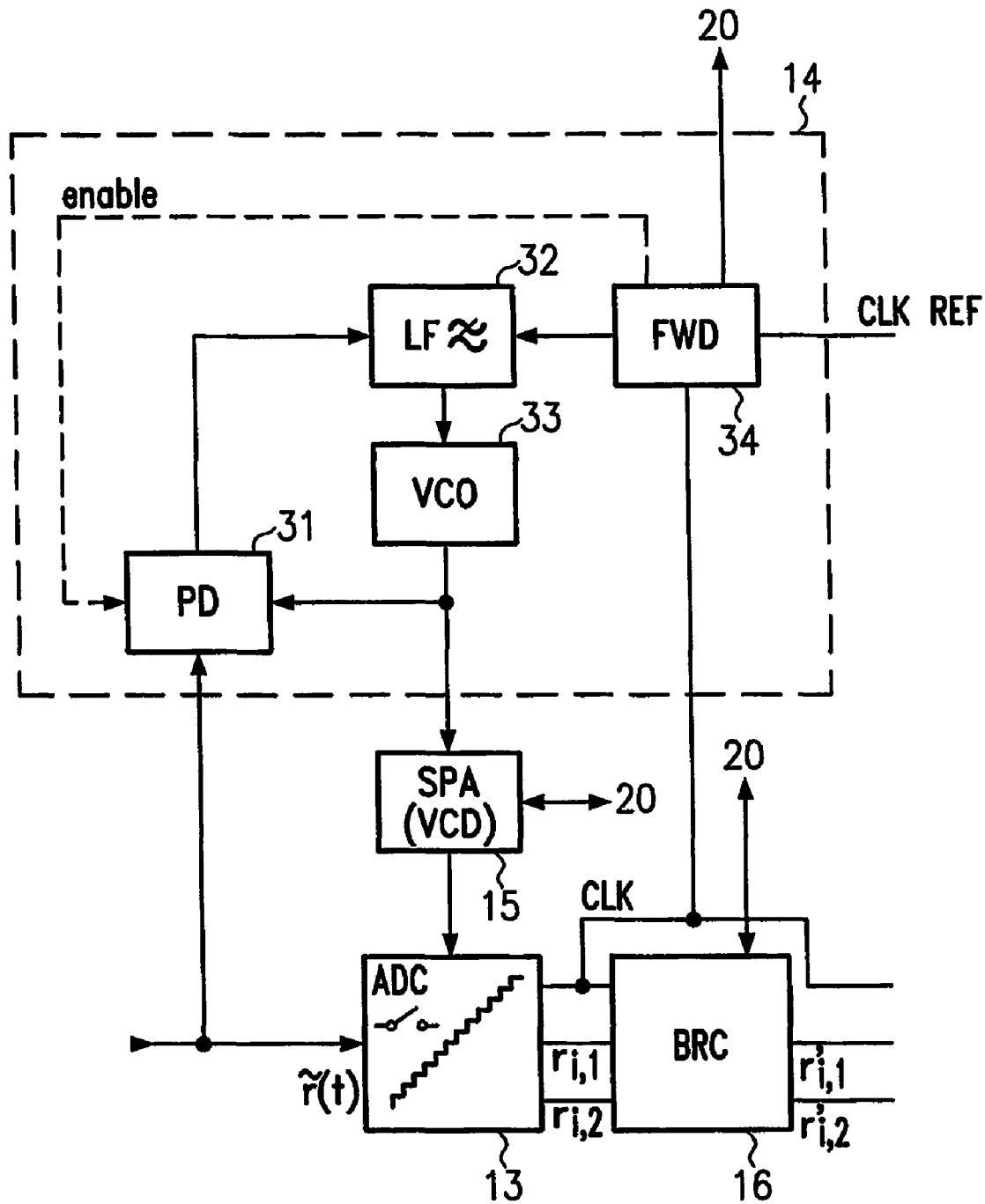
FIG. 2 shows a more detailed circuit diagram of the clock recovery circuit.

The clock recovery subsystem 14 is shown in more detail in FIG. 2. It may be referred to as a phase/frequency locked loop (PFLL). The clock recovery subsystem 14 comprises a phase detector (PD) 31, a loop filter (LF) 32, a voltage controlled oscillator (VCO) 33 and a frequency window detector (FWD) 34.

Initially, phase detector 31 is disabled and the frequency window detector 34 is active. The clock generated by VCO 33 is compared against a local reference clock CLK REF by a digital edge counting process (Cf. WO 02/30035 A1) performed by frequency window detector 34. In this way the frequency window detector 34 drags the VCO frequency into the target frequency window. When this frequency window is reached, FWD 34 is disabled and PD 31 is switched on and locks the clock of VCO 33 in frequency and phase to the received data stream.

Clock recovery subsystem 14 recovers a frequency and "some" sub-optimal phase with a fixed relation to the transmitted symbol stream.

For distorted signals, the recovered clock phase in general leads to sub-optimal or even very bad BER.

The sampling phase that is delivered from clock recovery subsystem 14 is dynamically adjusted in a delay locked loop (DLL), in a continuous or quasi-continuous way by a delay signal that is originally derived from the channel estimation (cf. European patent application number 03004079.4).

In order to limit the required range of (quasi-) continuous phase shifting within SPA circuit 15, which reduces power consumption, there is a discrete l·T/L, l=1, . . . , L, phase justification facility performing samples-to-bit synchronization.

Figure 3:
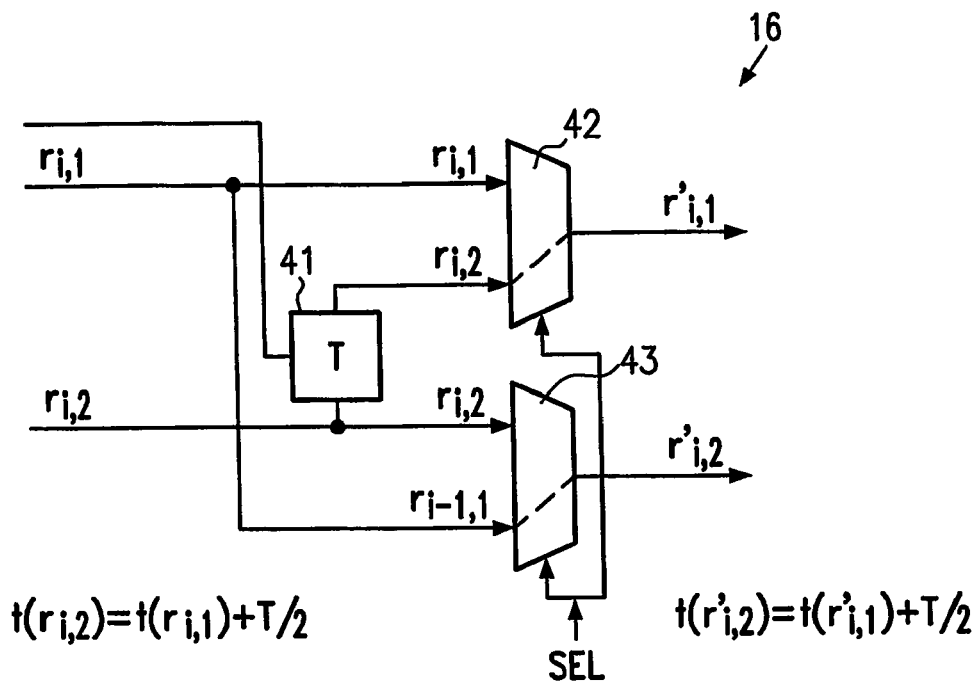
FIG. 3 shows a bit rearranging circuit.

An implementation of the phase justification facility for two-fold oversampling is the bit rearranging circuit shown in FIG. 3. The bit rearranging circuit comprises delay element 41 and multiplexers (MUXs) 42 and 43. The delay element 41 receives the a clock CLK output from ADC 13 which indicates when the ADC 13 outputs valid data. The delay element may be implemented by a flip-flop or shift register, depending on the frequency of the clock CLK. If the clock CLK has symbol frequency as in the embodiment of FIG. 1 a flip-fop is sufficient. The MUXs 42 and 43 are controlled via line SEL by control node 20. Either MUXs 42 and 43 output $r_{i,1}$ and $r_{i,2}$, respectively or MUXs 42 and 43 output $r_{i-1,2}$ and $r_{i,1}$, respectively, as shown in FIG. 3.

The bit rearranging circuit effectively adjusts the association of L=2 samples to one symbol in MLSD 17, at acquisition time. This helps to achieve initially optimum sampling phase in the center of the quasi-continuous shifting range. During channel tracking only quasi-continuous phase shifting by SPA 15 is used, because a large discrete phase step may lead to a loss of the channel model.

The channel estimation is based on decision-directed conditional quantized amplitude statistics, conditioned on a channel state as derived from the detected data $u_i$.

A channel state is characterized by the set of channel input symbols that fully determine the received noise-less amplitude in a channel with memory. A channel is said to have channel memory of m symbols, if the noise-free channel output depends on the combination of one "current" symbol and of m other pre- and/or post-cursors symbols. In this case, the channel length is m+1. As usual in equalization of uncoded sequences, the channel state can be represented by a sequence of N symbols. In a binary embodiment a symbol is equivalent to one bit. The sequence of symbols comprises one considered or current symbol $b_i$, h precursor symbols $b_{i-h}, \ldots b_{i-1}$, preceding the current symbol $b_i$ and j postcursor symbols $b_{i+1}, \ldots b_{i+j}$ following the current symbol (N=h+1+j). Consequently the channel state at the current symbol $b_i$ can be described by channel state vector $\underline{b}_i=(b_{i-h}, \ldots b_{i+j})$. Provided that there are S different symbols there are $S^N$ different channel state vectors. In the embodiments disclosed in connection with FIGS. 4 to 12, a channel state is defined by 3 consecutive symbols and a symbol corresponds to a bit, which may assume the values 0 or 1. A channel state is encoded into a transition in the trellis and for each transition a branch metric is calculated; it may be said that each possible channel state for a current symbol is tentatively considered.

In prior art (cf. EP 1 139 619 A1 and U.S. Pat. No. 5,263,053), the channel state is mostly described as the current symbol plus a number of precursor symbols and the channel output is said to depend on the current and those previous symbols. This is misleading, since the best mapping of a channel state to a bit to be decided depends on the nature of interference. For symmetrical pulse dispersion, which broadens a symbol to "diffuse" or "flow" into preceding or following symbols, it is best to decide a symbol with the help of both precursor and postcursor energy.

Figure 4:
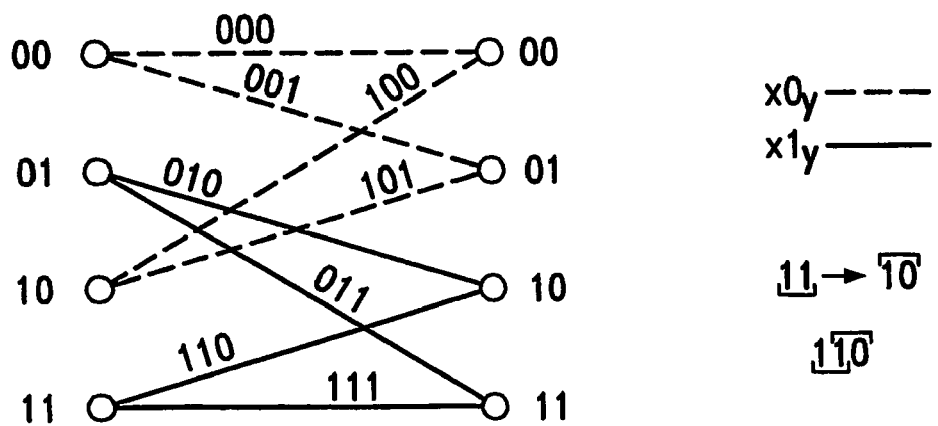
FIG. 4 shows a trellis for a MLSD.

The fractionally spaced MLSD for an un-coded ISI channel works on a canonical symbol-spaced ISI trellis, as shown in FIG. 4. In this trellis, the transitions are labeled in a three-bit notation that can e.g. be interpreted as a previous, a current, and a next symbol or bit in time sequence, when read from left to right. The state variables can be thought of as a shift register where a new bit moves in from the right and at the same time the leftmost bit moves out.

However, unlike a symbol spaced MLSD, the fractionally spaced MLSD receives L=2 T/L-spaced samples per symbol (bit) to be detected, which changes the way how metric increments or branch metrics are computed for each possible transition.

As will be described in more detail in connection with FIGS. 5 to 9 and 11, the fractionally spaced MLSD may determine a sample branch metric value BM for each of the L=2 samples and combines the L=2 sample branch metric values in order to assign overall branch metric values $BM_{tot}$ to the symbol spaced transitions in the trellis.

Figure 5:
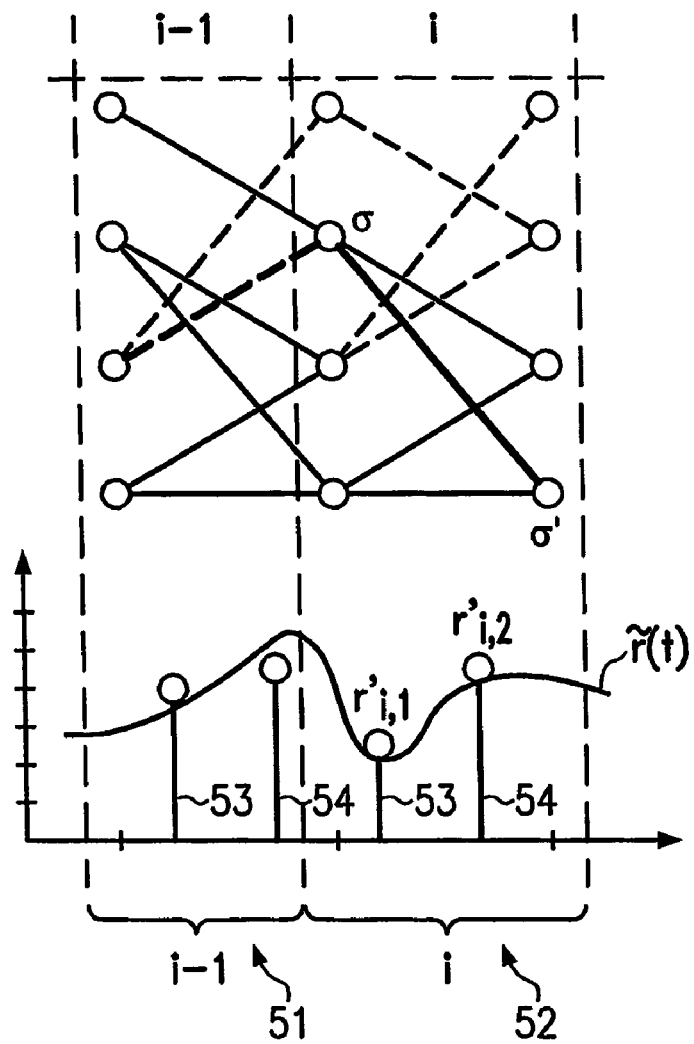
FIG. 5 illustrates the branch metric computation for different embodiments.
Figure 7:
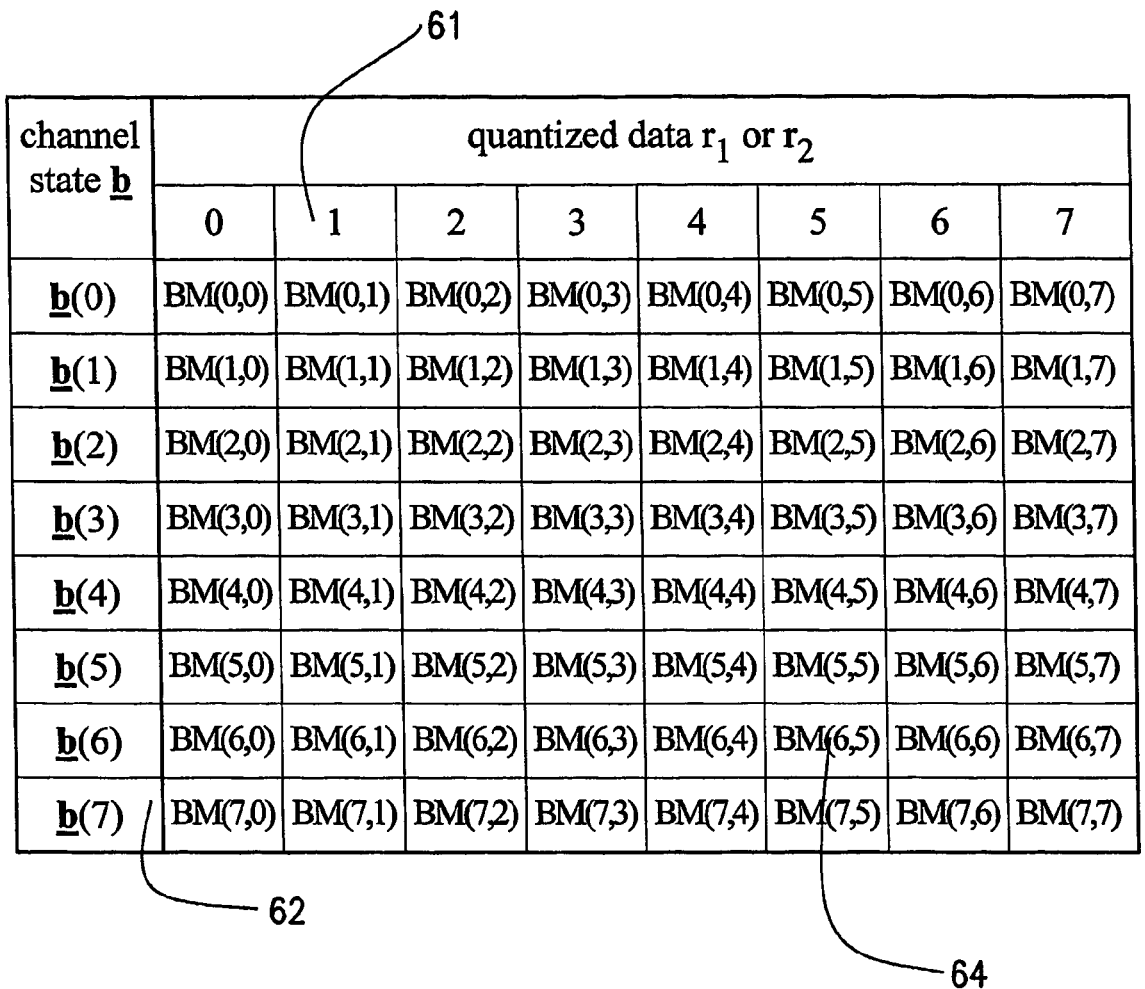
FIG. 7 shows the partial branch metrics of a channel model for which the samples of different sampling phases are assumed to be independent.

The branch metric $BM_{tot}$ is computed as the sum of the two sample branch metrics as shown in FIG. 5 (cf. equations (2) to (4)). FIG. 5 shows a trellis of the (i−1)th symbol period 51 and the ith symbol period 52, the output signal of the AGC $\tilde{r}(t)$ and the rearranged sample values $r'_{i,1}$ and $r'_{i,2}$ at a first sampling time 53 and second sampling time 54. In the simplest case, which is shown in FIG. 7, the two sample branch metric values are added, which neglects a possible correlation between the two samples, for simplicity.

In order to avoid the use of an explicit filter model as disclosed in U.S. Pat. No. 5,313,495 and U.S. Pat. No. 5,263,053, the channel estimation is based on decision-directed conditional quantized amplitude statistics, conditioned on a channel state as derived from the detected sequence.

In compliance with the conventions for MLSDs, branch metrics are logarithms of transition probabilities. The branch metrics may be obtained from a complete set of channel-state-conditioned amplitude histograms. An amplitude histogram is a discrete amplitude probability mass distribution (or amplitude distribution, for short) conditioned on channel states at a given sampling phase. Consequently, a channel-state-conditioned histogram is the amplitude distribution under the condition that the channel is in a given channel state and sampled at a fixed sampling phase. In addition, an amplitude histogram may be conditioned on sample values obtained at different sampling phases. As will be explained in connection with branch metrics below, an amplitude histogram obtained at the second sampling phase may be conditioned on the value obtained at the first sampling phase. The collection of such histograms for all possible channel states and all used over-sampling phases is called a (probabilistic) channel model. Sometimes it is necessary to distinguish the "complete" and the "phase-specific" channel model. A phase-specific channel model is the subset of a complete (probabilistic) channel model that is restricted to a given sampling phase. The complete channel model is the complete set of phase-specific (probabilistic) channel models for all L samplers or sampling phases.

Each histogram value is actually a frequency for counter value c for the occurrence of an event. An event is defined by a channel state and one ore more quantized associated amplitudes or sampling values within a period of time. Frequencies and counter values may be assumed to be proportional to estimates for transition probabilities by the weak law of large numbers. As a consequence the branch metrics may be a logarithm ln obtained from the measured frequencies or counter values by equation (1):

$$BM(\underline{b},r)=\ln(c(b,r)) \tag{1}$$

Probabilities are normalized to one i.e. the sum of the probabilities of all possible events is one. The counter values could also be normalized to one by dividing each counter value by the sum of all counter values. However, this operation is not necessary, since it decreases all branch metrics by the same amount. For finding the most likely path only the differences between the branch metrics influence the result. For the same reason, the base of the logarithm (log, ln, ld) and the difference between frequencies and counter values being the accumulation period is insignificant. There is a one-to-one relation between events and frequencies and counter values. It is assumed that there is also a one-to-one relation between counter values and branch metrics in the embodiments disclosed in the following. However, this is not necessarily the case in general. Statistical information like counter values may be obtained for different purposes than the branch metric calculation. To this end a larger number of events and corresponding counter values than the number of branch metrics may be obtained. Before taking a logarithm, the values of counters belonging to a subset of counters may be added. There may be more than one subset of counters.

Due to the one-to-one relationship between counter values or frequencies and branch metrics, counter values, frequencies and branch metrics may be arranged in a similar fashion and stored in similar data structures (cf. FIGS. 6 and 7). Moreover, due to the one-to-one relationship the branch metrics may be referred to as a channel model.

Figure 12:
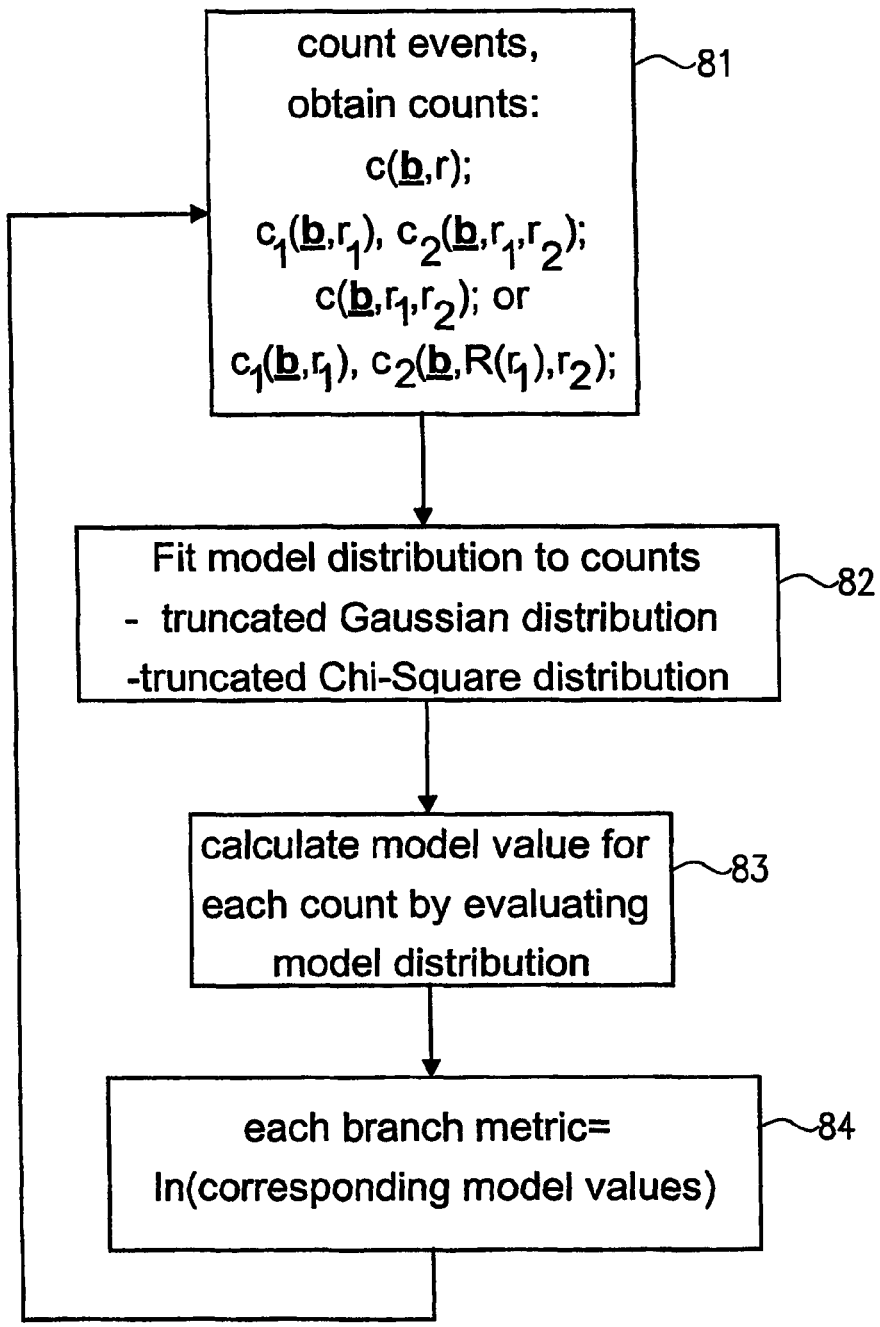
FIG. 12 illustrates the application of a channel model.

It must be made sure, that none of the frequencies or counter values of which the logarithm according to equation (1) is taken is equivalent to zero. This may be performed by replacing 0s by low values, by interpolation as explained in Sauer00 or by fitting a model to the measured frequencies or counter values as shown in FIG. 12.

A model distribution that is known to be appropriate for the channel in question (e.g. truncated Gaussian for noise limited links or truncated chi-square for optically amplified links) may be fitted to the measured histogram in step 82 after frequency or counter values are measured in step 81. Then the model distribution is evaluated in step 83 for the observed counter values or frequencies in order to obtain model values. The usual log-likelihood metric is then determined in step 84 by taking a logarithm of each model value. This has the advantage, that the model distributions do not provide 0-probabilities which causes difficulties when taking the logarithm. Then the process is repeated starting with the accumulation of counter or frequency values.

It is possible to use only a subset of the detected symbols for channel estimation (sub-sampling) in order to trade-off complexity in particular high-frequency performance against acquisition and tracking speed.

In the most specific embodiments, the branch metric for a transition is determined from L=2 samples tantamount to two-fold oversampling. Some of the embodiments can easily be generalized to L>2 samples.

As described earlier, the simplest method is to treat the L samples per symbol as conditionally independent, when conditioned only on the same channel state. This leads to $S^N Q$ different events and corresponding counter or frequency values. The frequency values 63 may be arranged in table form as shown in FIG. 6. The frequencies for one channel state 62 corresponding to an amplitude histogram are arranged in one row, whereas the frequencies belonging to one sample value 61 are arranged in one column. The independence of the symbols leads to a sum of sample branch metrics BM($\underline{b}$,r) 64 where each metric for a given sample depends only on the channel state $\underline{b}$ (trellis transition) and on the sample value r. The sample branch metrics 64 may be arranged in a similar form as the corresponding frequencies as shown in FIG. 7. The overall branch metric $BM_{tot}$ is calculated by equation (2):

$$BM_{tot}(\underline{b}, r_1, \ldots, r_L) = \sum_{l=1}^{L} BM(\underline{b}, r_l) \quad (2)$$

In equation (2) and in the following time dependence on discrete time Index i is suppressed where possible. However, in reality, the two samples associated with one symbol (bit) are correlated with each other. Moreover e.g. noise coloring in the receiver and the fact that the real channel memory is actually larger than the model's channel memory (i.e. due to so called convolution noise) influence the correlation of samples. Unlike the ISI-caused correlation between samples of adjacent bits, which is implicitly accounted for in the trellis diagram, this correlation is neglected in the simple realization above: by adding the metric values of the two samples, which corresponds to the product of their probabilities, the two samples are treated as stochastically independent. This simplification is sub-optimal because any existing noise correlation is not exploited.

As shown in Kavcic00 and Kavcic98, it is possible to take noise correlation over several symbols into account.

However, in a fractionally spaced receiver of this invention the first step would be to start with taking the correlation between samples belonging to the same symbol into account, which is expected to be even more significant than the correlation between samples at farther distance. It is not necessary to assume any specific, e.g. Gaussian, form of the noise process, as it is implicitly accounted for in the "measured" probabilistic channel model. With these modifications, the additive sample branch metric for a second sample $r_2$ following a first sample $r_1$ is additionally conditioned or made dependent on the value of the preceding sample $r_1$, in addition to the dependence on the channel state $\underline{b}$ and the value of the sample $r_2$ itself. The overall branch metric $BM_{tot}$ is calculated as the sum of a first sample branch metric $BM_1(\underline{b},r_1)$ depending on the channel state b and the first sample $r_1$ and a second sample branch metric $BM_2(\underline{b},r_1,r_2)$ depending in addition on the second sample $r_2$:

$$BM_{tot}(\underline{b},r_1,r_2) = BM_1(\underline{b},r_1) + BM_2(\underline{b},r_1,r_2) \quad (3)$$

The first sample branch metric $BM_1$ (reference numeral 66) may be arranged in table form as shown in FIG. 8. Reference numeral 65 refers to the first sample $r_1$. The second sample branch metric $BM_2$ (reference numerals 68 and 69) may be arranged in a three-dimensional structure as shown in FIG. 9. This means that second sample branch metric $BM_2$ for a specific first sample $r_1$ may be arranged in table form 68. (Q-1) other tables 69 are necessary to form the complete three-dimensional structure. Reference numeral 67 refers to the second sample $r_2$. In order to take the sample correlation into account, it is possible to "measure" for the second sample $r_2$ the amplitude distribution conditioned on the channel state 62, the value of the second sample 67 and on the sample value of the first sample. This leads to a significantly increased number of histograms in the phase-specific channel model shown in FIG. 9 of the second sample (Q amplitudes for the first sample times Q for the second sample, as opposed to just Q in the simple scheme) and to a correspondingly longer accumulation period for the same statistical significance.

Figure 10:
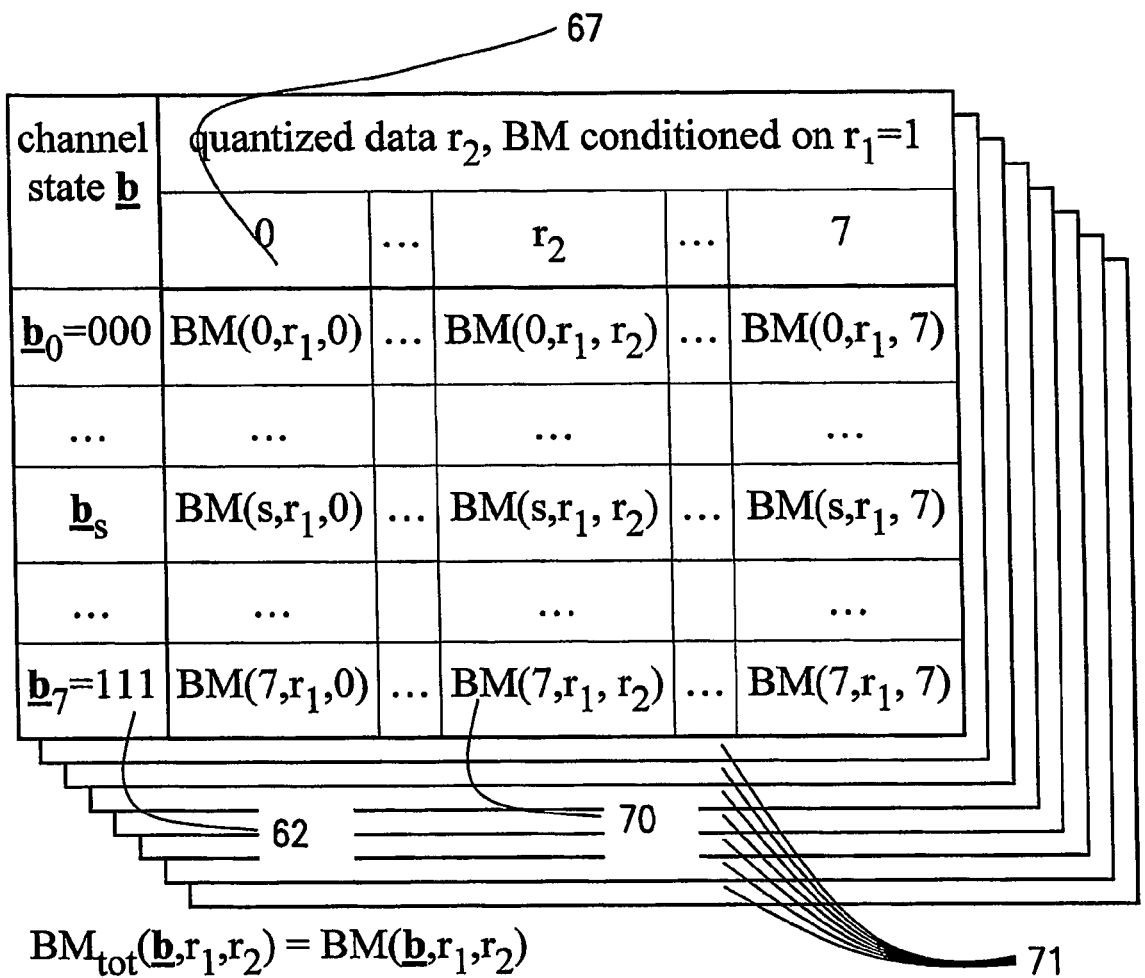
FIG. 10 shows the branch metrics of a channel model specific for the second sampling phase conditioned on the previous sampling value $r_1$ obtained at the first sampling phase.

In order to reduce complexity, events may be defined by a channel state b, the first sample value r1 and the second sample value r2 requiring $Q^2 S^N$ counters. Both, the counter values and the resulting branch metrics may be arranged in a three-dimensional structure as shown in FIG. 10. This means that sample branch metric BM for a specific first sample $r_1$ may be arranged in table form 70. (Q-1) other tables 71 are necessary to form the complete three-dimensional structure. The advantage of this procedure is that the overall branch metric can be immediately looked up without the need for an addition. Probably less important is that $S^N$ histograms equivalent to a table shown in FIG. 8 can be saved compared to the embodiment of FIGS. 8 and 9.

In order to further reduce the complexity of the approach illustrated in FIGS. 8 and 9, the second sample value $r_2$ could be conditioned only on a more coarse-grained first sample value: Rather than distinguishing Q amplitude levels for the first sample, only Q'<Q amplitude levels could be distinguished for the first sample. The case Q'=2 would be the minimum, corresponding to a "tentative hard decision" on the first sample. In this case the channel model size for the second sample is only doubled. This leads to $$BM_{tot}(\underline{b},r_1,r_2) = BM_1(\underline{b},r_1) + BM_2(\underline{b},R(r_1),r_2) \quad (4)$$

where R is the additional (conceptual) quantizer that maps the Q possible amplitude values into the Q'<Q possible coarse amplitude values. It may be implemented by simply taking into account the most significant bit(s) of $r_1$. Also in this embodiment the second sample branch metric $BM_2$ for a specific first sample $r_1$ may be arranged in table form 72. (Q'−1) other tables 73 are necessary to form a complete three-dimensional structure as shown in FIG. 11.

Obviously, further correlation schemes are conceivable, as e.g. one taking correlation between samples of adjacent symbols into account (discrete time index necessary for clarity).

$$BM_{tot}(\underline{b}, r_1[i], r_2[i]) = BM_1(\underline{b}[i], R(r_2[i-1], r_1[i]) + BM_2(\underline{b}[i], R(r_1[i]), r_2[i]) \quad (5)$$

In equation (5) discrete time index i was added for clarity.

Rather than using conventional branch metrics, which constitute logarithms of transition probabilities, branch metrics could be used, which are proportional to the transition probabilities. In the latter case branch metrics must be multiplied in order to find the most likely path. As a generic term for mathematical operations like adding and multiplying "combining" is used.

In another embodiment a fractionally MLSD detects a fractional symbol for each sample provided by the ADC 13 which performs L-fold oversampling. In this embodiment each channel state is defined by a sequence of h precursor fractional symbols, a current fractional symbol having the value $r'_{i,l}$, and j postcursor fractional symbols. In this embodiment the MLSD generates detected data $u_{i,l}$ at a frequency L times higher than the symbol frequency. Under ideal circumstances all over-sampled detected fractional data $u_{i,l}$ within one symbol period and consequently having the same i should be equivalent no matter which value l has. When calculating the branch metrics from measured frequencies or counter values a model may be used which takes into account that all fractional symbols belonging to one symbol should have the same value. In order to enforce that all fractional symbols belonging to one symbol are identical, the conditional probabilities for all transitions between a first fractional symbol and a second fractional symbol belonging to the same symbol may be set to 0 if the first and the second fractional symbols are different and set to 1 otherwise.

In another embodiment intra-symbol transitions between different fractional symbols may be allowed. In this embodiment the MLSD 17 may be considered to provide soft decision results i.e. identical fractional symbols for more reliable symbols and differing fractional symbols for less reliable symbols. Actually a soft metric may be defined by the number of fractional symbols having a value of 1 and belonging to a current symbol divided by the oversampling factor L. The final decision about a symbol is up to the FEC decoder, which may reverse symbol decisions in any embodiment in order to reduce the BER from typically $10^{-4}$ after the MLSD to below $10^{-12}$ required for data transmission.

The estimated "channel model" consists of a finite set of $(S^N \cdot Q)$ branch metrics BM which my be arranged in table form as shown in FIG. 2b. There is one branch metric provided for every channel state and for every quantized data value $r_i$ at the current symbol. The branch metrics may be stored in a two-dimensional array and addressed by two indices one ranging from 0 to $S^N-1$ and designating the channel states, the other ranging from 0 to Q−1 and designating the quantized value of the current symbol. In another embodiment the branch metrics may be arranged in an (N+1)-dimensional array. The frequencies, counter values or branch metrics may be arranged in memory in a similar form as the branch metrics i.e. in a 2-dimensional or (i+1)-dimensional array. More specifically the frequencies 63, the sample branch metrics 64 and 66 may be stored in a two-dimensional array, whereas sample branch metrics 68, 69, 70, 71 and 72, 73 may be stored in a three-dimensional array for two-fold oversampling.

In another embodiment all data structures may be stored in one-dimensional arrays. The index of the array element storing frequencies, counter values or branch metrics is obtained by concatenating the channel state and the sample value(s).

In yet a further embodiment, each symbol defining a channel state may be used as an index in one dimension. The arrays are (N+1) dimensional or (N+L) dimensional.

It is noted that from the frequencies or counter values which may be arranged in one or more data structures illustrated by FIGS. 8 and 9, FIG. 10 or FIG. 11 the counter values of counters 14 to 21 of EP03004079.4 can be calculated by summing the frequencies f or counter values over all channel states $\underline{b}$ for each digitized value $r'_{i,1}$ of first sample (FIG. 8 and FIG. 10) and by summing the counter values over all channel states b and first fractional samples $r_{i,1}$ for each digitized value $r'_{i,2}$ of second sample (FIGS. 9, 10 and 11). More specifically, in the case of FIGS. 8 and 9 the following equations (6) and (7) may be used to calculate the counter values $count_{1,r1}$ of counters 14 to 17 of EP03004079.4 and $count_{2,r2}$ of counters 18 to 21 of EP03004079.4:

$$count_{1,r_1} = \sum_{\underline{b}} f_1(\underline{b}, r_1) \quad (6)$$

$$count_{2,r_2} = \sum_{r_1} \sum_{\underline{b}} f_2(\underline{b}, r_1, r_2) \quad (7)$$

In the case of FIG. 10 the following equations may be used:

$$count_{1,r_1} = \sum_{r_2} \sum_{\underline{b}} f(\underline{b}, r_1, r_2) \quad (8)$$

$$count_{2,r_2} = \sum_{r_1} \sum_{\underline{b}} f(\underline{b}, r_1, r_2) \quad (9)$$

In the case of FIG. 11 the following equation may be used to calculate $count_{2,r2}$:

$$count_{2,r_2} = \sum_{R(r_1)} \sum_{\underline{b}} f_2(\underline{b}, R(r_1), r_2) \quad (10)$$

From the latter calculated values a population difference parameter may be calculated in compliance with EP03004079.4 for controlling SPA circuit 15 in order to optimize the sampling phase.

In a similar fashion, by summing over all channel states and sampling phases if applicable for each digitized value $r_{i,l}$ counter values $count_q$ for counters 51 to 54 of subsets $S_q$ of EP03009564.0 may be obtained from which a population difference parameter as described in EP03009564.0 may be calculated. In accordance with the disclosure of EP03009564.0 this population difference parameter may be minimized that the receiver control node 20 sets the AGC/VGA 12 to an appropriate i.e. optimized amplification. In the case of the embodiment of FIGS. 8 and 9 equation (11) may be used.

$$\text{count}_q = \sum_{r_1 \in S_q} \sum_{\underline{b}} f_1(\underline{b}, r_1) + \sum_{r_2 \in S_q} \sum_{r_1} \sum_{\underline{b}} f_2(\underline{b}, r_1, r_2) \quad (11)$$

In the case of FIG. 10 the following equation may be used:

$$\text{count}_q = \sum_{r_1 \in S_q} \sum_{r_2} \sum_{\underline{b}} f(\underline{b}, r_1, r_2) + \sum_{r_2 \in S_q} \sum_{r_1} \sum_{\underline{b}} f(\underline{b}, r_1, r_2) \quad (12)$$

In the case of FIG. 11 the following equation may be used:

$$\text{count}_q = \sum_{r_1 \in S_q} \sum_{\underline{b}} f_1(\underline{b}, r_1) + \sum_{r_2 \in S_q} \sum_{R(r_1)} \sum_{\underline{b}} f_2(\underline{b}, R(r_1), r_2) \quad (13)$$

Assuming that the channel statistics is a correct model of the actual channel, the branch metrics derived from the channel model are used to detect the bit sequence. In order to track the channel, the sample values and the detected bit sequence are used to measure the channel state conditioned amplitude statistics, i.e. a new channel model. In order not to overload the control node 20 and at the same time to optimize tracking capability, several model-updating strategies may be used. In the simplest case the current channel model is used to detect the received bits for a period of time, called accumulation period 171 (see FIG. 13). During this accumulation period 171, new channel observations are made. After the observation period 171, the measured amplitude histograms are used to compute new branch metrics during a computation period 183. Finally, the new branch metrics are loaded into the MLSD and the cycle restarts with accumulation period 191. Between accumulation periods 171, 191 and computation period 183 transfer delays 182 may occur. The period during which no acquisition takes place may be designated idle period which comprises the transfer delays 182 and the computation period 183. This cycle is called update cycle 170 (iteration, period, or interval).

Figure 13:
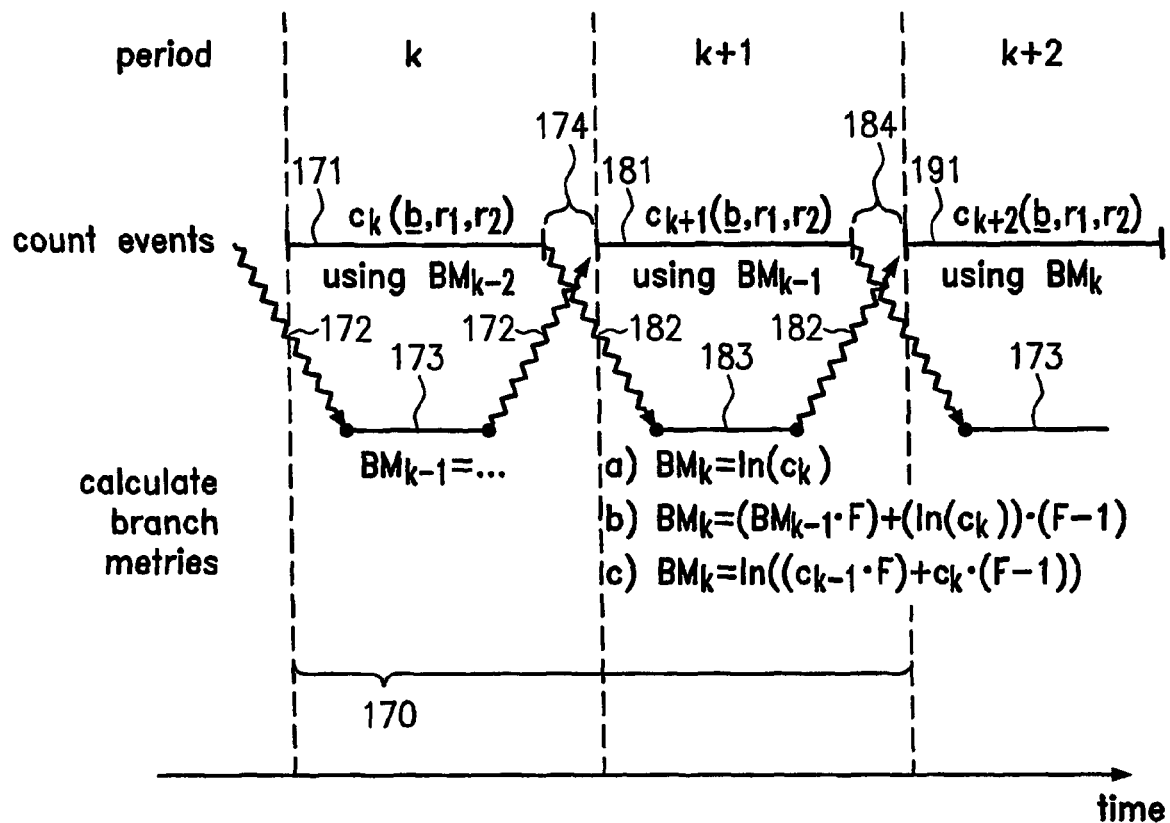
FIG. 13 illustrates an update cycle for parallel accumulation and branch metric computation.

To speed up the update of the branch metrics and to shorten the idle periods, the calculation of the branch metrics may be performed in an interlaced manner as shown in FIG. 13.

While the accumulation of count $c_k(\underline{b},r_1,r_2)$ are accumulated in a accumulation period 171 in period k the branch metrics $BM_{k-1}$ are calculated during calculation period 173 based on counter values accumulated during the previous period k−1. In the following period k+1 the branch metrics $BM_{k-1}$ are used to detect the symbols and consequently to accumulate counter values $c_{k+1}(\underline{b},r_1,r_2)$ during accumulation period 181. Simultaneously during computation period 183 the branch metrics $BM_k$ are obtained based on counter values $c_k(\underline{b},r_1,r_2)$. These branch metrics will be used for symbol detection during accumulation period 191. In this embodiment the idle periods 174 and 184 during which no accumulation is performed are significantly smaller than in an embodiment in which accumulation and metric computation are performed consecutively. An update cycle 170 comprises two periods e.g. periods k and k+1. In another embodiment old and new frequencies or counter values may be combined using a forgetting factor. That means that the old data are weighted by the forgetting factor and the new data are weighted by (1-forgetting factor) before the weighted data are added to form the new data. The same procedure may be applied to the branch metrics rather than the frequencies or counter values the branch metrics are calculated from. This saves resources since it is not necessary to save the old frequencies or counter values whereas the old branch metrics have to be saved anyway for the operation of the MLSD 17. Taking the logarithm is a non-linear operation. However, only small changes of the branch metrics are expected from update to update. This justifies the application of a forgetting factor directly on the branch metrics.

In contrast to the embodiments of this invention, known FS MLSE receivers based on filter models of channels (e.g. U.S. Pat. No. 5,313,495 and U.S. Pat. No. 5,263,053) update the channel parameters in symbol time which requires more circuit resources. On the other hand known FS MLSDs are employed in cellular telephone systems which do not operate at high transmission rates.

Figure 14:
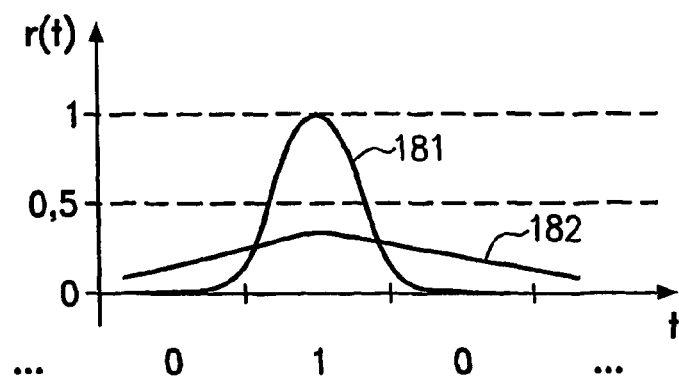
FIG. 14 shows a level crossing of isolated ones.
Figure 15:
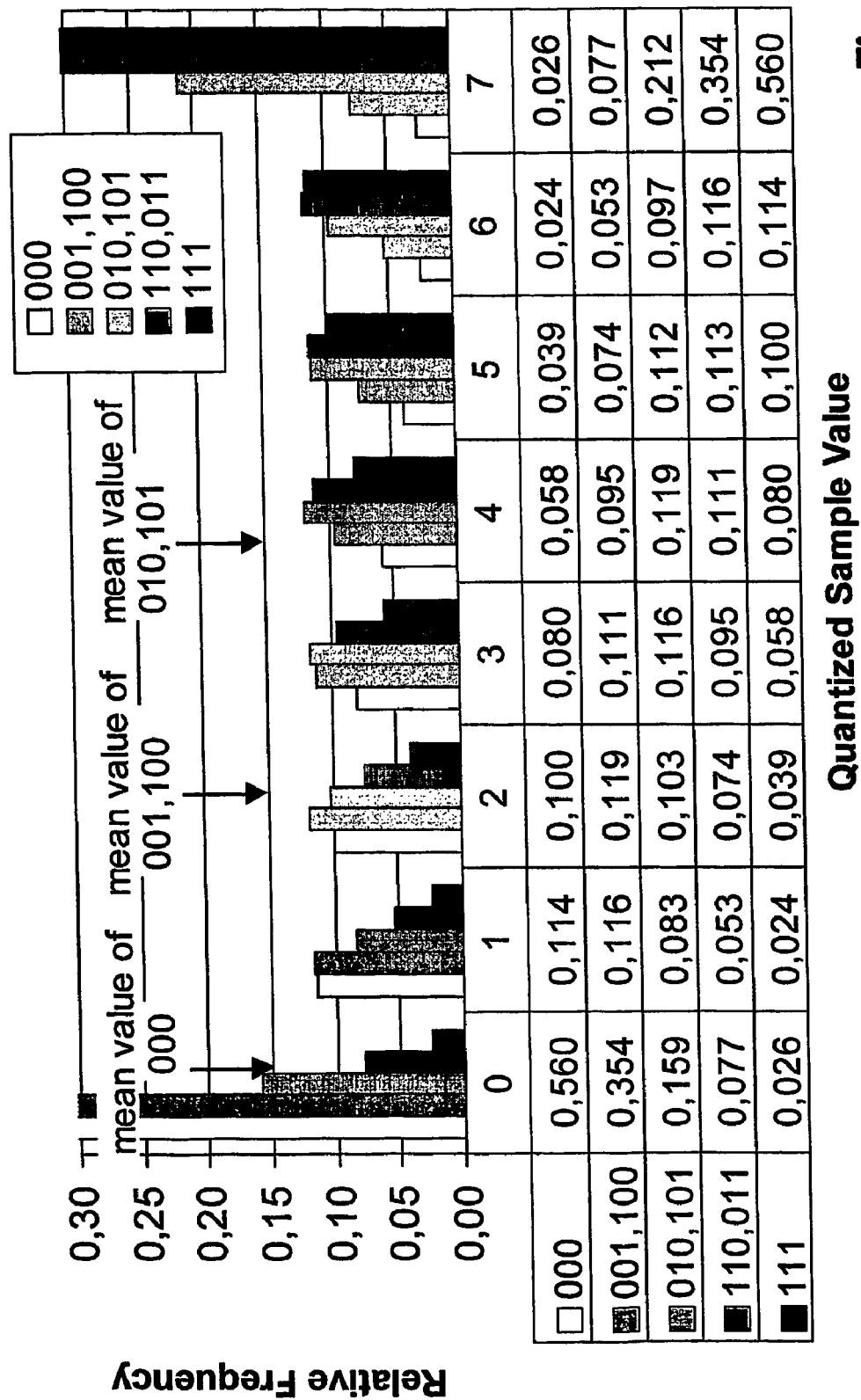
FIG. 15 shows a starting histogram.

For channels impaired mainly by GVD and or PMD, channel acquisition is started from a starting channel model as shown in FIG. 15. These and the derived branch metrics are sufficient to acquire the correct channel model in a few update iterations. This unique starting channel model is based on the observation that, with increasing dispersion, patterns of isolated zeroes and isolated ones show a "threshold crossing" behavior as shown in FIG. 14: e.g. for low dispersion, the maximum of the response 181 to an isolated one is well above a threshold of 0.5, whereas for higher dispersion and increased pulse broadening the maximum of response 182 remains below the threshold. Consequently, the starting histogram for a detected sequence of 010 is chosen identical to a detected sequence of 101 as shown in FIG. 15. Moreover these identical starting histograms are chosen as almost symmetrical; they will then converge in the correct direction. The different starting histograms for each channel state are shown for each in FIG. 15, where the arrows roughly indicate the mean value of each histogram type.

Figure 16:
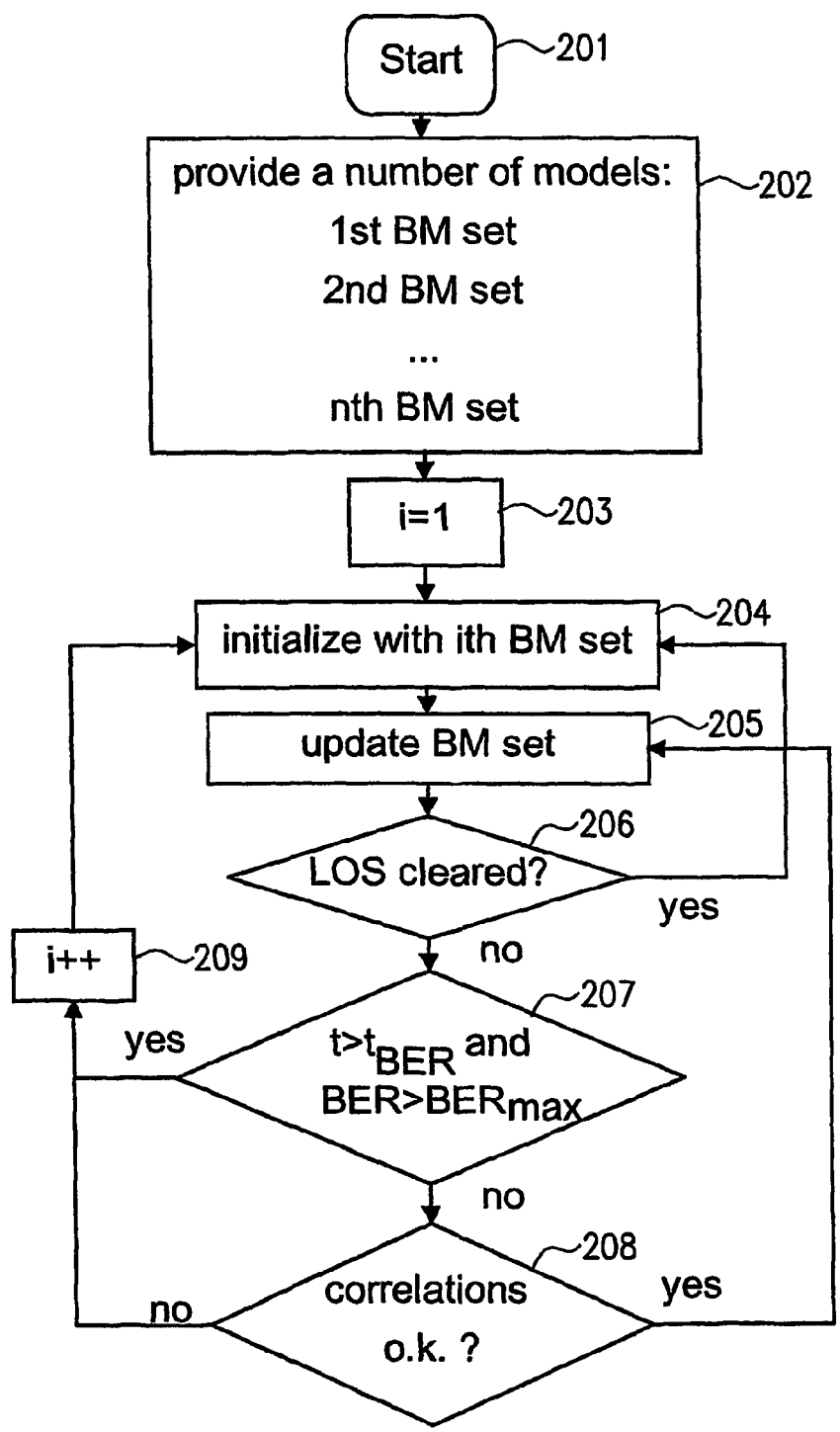
FIG. 16 shows a method for channel monitoring and selection of an appropriate starting histogram.

For more general channels, a set of channel models may be required in order to ensure convergence of the acquisition procedure. Such an acquisition procedure is illustrated in FIG. 16. A suitable set of channel models is provided in step 202. It can be used e.g. in a try-and-error fashion as illustrated by steps 204 to 209 or based on some auxiliary channel measurements e.g. based on next neighbor autocorrelation.

The starting channel model can be identical for the L=2 sampling phases. This does not only apply to the embodiment of FIGS. 6 and 7, according to which identical branch metrics are used for the first and second sampling phase, but also to the other embodiments of FIGS. 8 to 11. If specific, non-symmetrical, starting channel models are used, it may be necessary to perform a try-and-error procedure for the L=2 different settings of the bit rearranging circuit, or to ensure a minimum (quasi-) continuous phase adjustment setting at the begin of channel tracking.

Channel monitoring as illustrated by steps 204 to 209 may be performed as a part of the acquisition procedure in order to select an appropriate starting channel model. On the other hand channel monitoring can be an ongoing process during channel tracking in order to detect the need for a channel re-acquisition procedure. It is based on several observables:

LOS: When the PI signals LOS, channel is considered lost. A re-acquisition procedure is started once LOS clears in step 206.

BER estimation: When the estimated BER is above a given threshold in step 207, a channel re-acquisition is started. A new channel re-acquisition may be prevented, if a period of time $t_{BER}$ since the previous reacquisition did not yet elapse. Before initiating the re-acquisition in step 204 a new starting channel model is selected in step 209.

Channel Model Verification: The histograms of the channel model are monitored for pathological amplitude statistics in step 208. Before initiating the re-acquisition in step 204 a new starting channel model is selected in step 209. Some examples of model Insanity indicators are:

Correlation between channel state 111 and 000 above a given threshold

Mode of 111 histogram below given threshold

Mode of 000 histogram above given threshold

Correlation of histograms with a uniform histogram above a given threshold

The (statistical) mode is the value where the probability distribution (histogram) has a maximum. The maximum of the 111 histogram is expected at medium to high quantized amplitude level and the maximum of the 000 histogram at low amplitude levels. A histogram is uniform, if all bins have value 1/Q.

Optionally, signal statistics of the L samples per symbol are measured. These can be used for channel monitoring or to estimate channel conditions e.g. to distinguish a high dispersion from a low dispersion case. In particular these are Measured values of the sample autocorrelation function $R(0), R(T/2), R(T), R(3T/2)$, relative to timing phase of first sample. E.g. for the case L=2 we have:

$$R(0) = \frac{1}{N}\sum_{k}^{N} r_1[i]^2 \quad (14)$$

$$R(T/2) = \frac{1}{N}\sum_{k}^{N} r_1[i]r_2[i] \quad (15)$$

$$R(T) = \frac{1}{N}\sum_{k}^{N} r_1[i]r_1[i+1] \quad (16)$$

$$R(3T/2) = \frac{1}{N}\sum_{k}^{N} r_1[i]r_2[i+1] \quad (17)$$

Population difference parameter as per EP03004079.4

Uniformity parameter as per EP03009564.0

In another embodiment, acquisition could further be achieved by a suitable explicit training sequence, especially employing critical or characteristic patterns such as isolated one ( . . . 00100 . . . ) or isolated zero ( . . . 11011 . . . ) i.e. 010 and 101 in the case of N=3. This could either substitute or aid the acquisition using predetermined starting histograms. Selection of starting histograms could be based on measured estimates of the sample autocorrelation function values $R(T/2), R(T), R(3T/2)$.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

What is claimed as new and desired to be protected by Letters Patent of the United States is:

1. A method for channel estimation for an optical receiver comprising the steps of:

digitizing, by the optical receiver, an analog signal, in order to start with a step of digitizing in method form ($\tilde{r}(t)$) representing a sequence of symbols ($d_i$) thereby associating a digital word out of a plurality of possible digital words to the level of said analog signal at each sampling time; a symbol period having at least two sampling times; each digital word corresponding to one out of a plurality of quantization levels;

determining the most likely sequence ($u_1$) of said symbols ($d_i$);

providing branch metrics; and obtaining said branch metrics from frequencies of the digital words resulting from said digitizing and the symbols of said most likely sequence ($u_1$).

2. The method of claim 1, further comprising the steps of:

counting each kind of event during said digitizing to produce a count, each event being defined by a channel state and a digital word out of said plurality of digital words; each channel state being defined by a sequence of symbols;

calculating a sample branch metric for each kind of event; and calculating a branch metric by combining the sample branch metric for each digital word obtained at a sampling time during a symbol period.

3. The method of claim 2, wherein said sample branch metric is a logarithm of the count of the respective kind of event and the combination of sample branch metrics is performed by adding the count.

4. The method of claim 2, further comprising the steps of fitting a model distribution to the counts of each kind of event;

evaluating the model distribution for each kind of event in order to obtain one model value for each kind of event; and calculating said sample branch metric for each kind of event using the respective model value.

5. The method of claim 1, wherein each symbol period includes a first sampling time and a second sampling time and further comprising the steps of:

associating a first digital word at the first sampling time and a second digital word at the second sampling time to said analog signal;

counting one or more of a first event, each said first event being defined by a first channel state and the first digital word; each first channel state being defined by the sequence of symbols comprising the symbol to which said first digital word is associated;

counting one or more of a second event, each of said second event being defined by said first channel state, said first digital word and said second digital word following said first digital word;

calculating a first sample branch metric for each said first event;

calculating a second sample branch metric for each said second event; and calculating a branch metric for a second channel state and third and fourth digital words by combining the first sample branch metric for said second channel state and said third digital word and the second sample branch metric for said second channel state, said third digital word and said fourth digital word; said second channel state being defined by the sequence of symbols comprising the symbol to which said third and fourth digital words are associated.

6. The method of claim 1, wherein each symbol period includes a first sampling time and a second sampling time, and further comprising the steps of:

associating a first digital word at the first sampling time and a second digital word at the second sampling time to said analog signal;

counting a first kind of event, each first kind of event being defined by a first channel state and the first digital word; each first channel state being defined by the sequence of symbols comprising the symbol to which said first digital word is associated;

grouping said possible digital words into groups of digital words; associating the coarse digital word to each group of digital words;

counting a second kind of event, each second kind of event being defined by said first channel state, the coarse digital word associated to said first digital word and the second digital word following said first digital word;

calculating a first sample branch metric for each said first kind of event;

calculating a second sample branch metric for each said second kind of event; and calculating a branch metric for a second channel state and third and fourth digital words, by combining the first sample branch metric for said second channel state and said third digital word and the second sample branch metric for said second channel state, the coarse digital word associated with said third digital word and said fourth digital word; said second channel state being defined by the sequence of symbols comprising the symbol to which said third and fourth digital words are associated.

7. The method of claim 1, wherein each symbol period includes a plurality of sampling times and further comprising the steps of:

counting at least one kind of event, each kind of event being defined by a first channel state, and a digital word for each sampling time during a symbol period of a first symbol;

each first channel state being defined by the sequence of symbols comprising the first symbol;

calculating a sample branch metric for each kind of event; and calculating a branch metric for a second channel state and a second symbol by combining the sample branch metrics for said second channel state and each digital word associated to said second symbol; said second channel state being defined by the sequence of symbols comprising the second symbol.

8. The method of claim 1, further comprising the steps of recovering the clock of the symbols; and delaying said clock in order to minimize a bit error rate of said digitized analog signal by optimizing the sampling times during said digitizing.

9. The method of claim 8, wherein the delay of said clock is adjusted based on bit error rate estimates obtained from said most likely sequence ($u_1$) of symbols ($d_i$).

10. The method of claim 9, wherein the delay of said clock is adjusted in order to maximize a population difference parameter.

11. The method of claim 1, further comprising the steps of:

adjusting the sampling times by delaying a clock by a delay being quasi-continuously, adjustable within a range of half of the symbol period; and performing discrete sampling time adjustment by rearranging the sequence of digital words.

12. The method of claim 1, wherein the branch metrics are calculated for determining a channel state during a following accumulation period (k+1) as the sum of the branch metrics for determining the channel state during a current accumulation period (k) weighted by a forgetting factor plus the logarithm of a respective count of events obtained during a previous accumulation period (k−1) weighted by one minus the forgetting factor.

13. The method of claim 1, further comprising the steps at:

defining a channel state as a sequence of binary symbols which represent "0" or "1"; and setting the branch metrics for channel states for isolated 0s and 1s, i.e. "... 11011 ..." and "... 00100 ...", respectively, to identical values when initializing the branch metrics.

14. The method of claim 1, further comprising the steps of:

defining a channel state as a sequence of binary symbols which represent "0" or "1"; and setting the branch metrics of channel states symmetrical to a considered symbol $b_3$ i.e. $b_1b_2b_3b_4b_5$ and $b_5b_4b_3b_2b_1$, to identical values when initializing the branch metrics.

15. The method of claim 14, further comprising the steps of:

monitoring at least one of the following conditions:

a loss of signal output by a physical interface is being cleared;

a bit error rate in said most likely sequence (u1) of symbols is still above a predetermined threshold after a predetermined period of time after the initialization of said branch metrics;

pathological amplitude statistics are determined comprising one of:

a correlation between a only-1 channel state and an only-0 channel state being above the predetermined threshold;

a mode of only-1 channel state below the predetermined threshold;

the mode of only-0 channel state above the predetermined threshold; and a correlation of histograms with uniform distribution above a given threshold; and initializing said branch metrics if one of the conditions above occurs.

16. The method of claim 15, wherein the branch metrics are reinitialized with different values than values used at the previous initialization.

17. A method for channel estimation comprising the steps of:

digitizing an analog signal ($\tilde{r}(t)$) having a sequence of symbols ($d_i$) thereby associating one digital word ($r_{i,1}$, $r_{i,2}$) out of a plurality of digital words to the level of said analog signal at each sampling time; a symbol period having at least one sampling time; each digital word corresponding to one out of a plurality of quantization levels;

determining the most likely sequence ($u_1$) of said symbols ($d_i$);

counting at least one event; thereby obtaining a counter value for each event each event being defined by a channel state and a current digital word; each channel state being defined by a pattern of symbols relative to a current symbol determined at the time of said current digital word;

fitting a model distribution to said counter values; and obtaining a branch metric on the basis of said fitted model distribution.

18. The method of claim 17, wherein the symbol period comprises at least two sampling times.

19. The method of claim 17, further comprising the steps of:
- counting each kind of event during a current accumulation period (k), said channel state being determined on branch metrics being calculated during a previous accumulation period (k−1); and
- calculating the branch metrics for determining the channel states during a following accumulation period (k+1) while each kind of event is counted during the current accumulation period (k).

20. The method of claim 17, wherein the branch metrics are calculated for determining the channel states during a following accumulation period (k+1) as the logarithm of the sum of the count of events obtained during accumulation periods before a previous accumulation period (k−1) weighted by a forgetting factor plus the count of events obtained during the previous accumulation period (k−1) weighted by one minus the forgetting factor.

21. The method of claim 17, wherein each symbol period includes a first sampling time and a second sampling time and further comprising the steps of:
- associating a first digital word at the first sampling time and a second digital word at the second sampling time to said analog signal;
- counting one or more of a first event, each said first event being defined by a first channel state and the first digital word; each first channel state being defined by the sequence of symbols comprising the symbol to which said first digital word is associated;
- counting one or more of a second event, each said second event being defined by said first channel state, said first digital word and the second digital word, the second digital word following said first digital word;
- calculating a first sample branch metric for each said first event;
- calculating a second sample branch metric for each said second event and calculating the branch metric for a second channel state and third and fourth digital words by combining the first sample branch metric for said second channel state and the third digital word and the second sample branch metric for said second channel state, said third digital word and said fourth digital word; said second channel state being defined by the sequence of symbols comprising the symbol to which said third and fourth digital words are associated.

22. The method of claim 17, wherein the branch metric is calculated for determining the channel state during a following accumulation period (k+1) as a sum of branch metrics for determining the channel state during a current accumulation period (k) weighted by a forgetting factor plus the logarithm of the respective count of events obtained during a previous accumulation period (k−1) weighted by one minus the forgetting factor.

23. The method of claim 17, further comprising the steps of:
- defining the channel state as a sequence of binary symbols which represent "0" or "1"; and
- setting the branch metric for the channel state for isolated 0s and 1s "i.e." and " . . . 00100", respectively, to identical values when initializing the branch metric.

24. A symbol detector for an optical receiver comprising:
- an analog-to-digital converter for digitizing an analog signal ($\tilde{r}(t)$), the analog signal including a sequence of symbols ($d_1$) thereby associating one digital word out of a plurality of digital words to the level of said analog signal at each sampling time; each symbol period comprising at least two sampling times; each digital word corresponding to one out of a plurality of quantization levels;
- a fractionally spaced maximum-likelihood sequence detector operatively coupled to said analog-to-digital converter for determining the most likely sequence ($u_1$) of said symbols ($d_j$); and
- a channel model unit operatively coupled to said maximum-likelihood sequence detector in order to provide branch metrics to said maximum-likelihood sequence detector, said branch metrics being obtained from frequencies of the digital words output by said analog-to-digital converter and the symbols ($u_i$) being determined by said fractionally spaced maximum-likelihood sequence detector.

25. The symbol detector of claim 24, wherein said analog-to-digital converter performs two-fold over-sampling.

26. The symbol detector of claim 24, further comprising a clock recovery subsystem operatively coupled to an input of said analog-to-digital converter for receiving said analog signal ($\tilde{r}(t)$); said clock recovery subsystem for recovering the clock of the symbols; and
- a sampling phase adjustment circuit connected to said clock recovery subsystem for delaying said clock in order to minimize a bit error rate of said symbol detector by optimizing the sampling times of said analog-to-digital converter, said clock recovery subsystem being connected to said analog-to-digital converter for providing said delayed clock to said analog-to-digital converter.

27. A symbol detector for an optical receiver comprising:
- an analog-to-digital converter for digitizing an analog signal ($\tilde{r}(t)$ including a sequence of symbols ($d_i$) thereby associating one digital word out of a plurality of digital words to the level of said analog signal at each sampling time; each symbol period comprising at least one sampling time; each digital word corresponding to one out of a plurality of quantization levels;
- a maximum-likelihood sequence detector operatively coupled to said analog-to-digital converter for determining the most likely sequence ($u_i$) of said symbols ($d_i$); and
- a channel model unit operatively coupled to said maximum-likelihood sequence detector for providing branch metrics to said maximum-likelihood sequence detector and for counting events; each event being defined by a channel state and a current digital word; each channel state being defined by a pattern of symbols relative to a current symbol determined at the time of said current digital word; a counter value being associated to each event, said channel model unit fitting a model distribution to said counter values and obtaining a branch metric based on said fitted model distribution.

* * * * *